(12) United States Patent
Kim et al.

(10) Patent No.: US 11,813,975 B2
(45) Date of Patent: *Nov. 14, 2023

(54) LIGHTING APPARATUS FOR VEHICLE

(71) Applicant: HYUNDAI MOBIS CO., LTD., Seoul (KR)

(72) Inventors: Do Hyung Kim, Yongin-si (KR); Soon Mo Lee, Yongin-si (KR); Moo Kwan Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/062,545

(22) Filed: Dec. 6, 2022

(65) Prior Publication Data

US 2023/0098087 A1 Mar. 30, 2023

Related U.S. Application Data

(63) Continuation of application No. 17/568,572, filed on Jan. 4, 2022, now Pat. No. 11,607,988.

(30) Foreign Application Priority Data

May 20, 2021 (KR) .......................... 10-2021-0064795

(51) Int. Cl.
*G06V 20/58* (2022.01)
*F21W 102/165* (2018.01)
*B60Q 1/076* (2006.01)
*F21S 45/47* (2018.01)
(Continued)

(52) U.S. Cl.
CPC .............. *B60Q 1/076* (2013.01); *F21S 45/47* (2018.01); *G06V 20/58* (2022.01); *B60W 2420/42* (2013.01); *F21S 41/141* (2018.01); *F21W 2102/165* (2018.01); *F21Y 2115/10* (2016.08)

(58) Field of Classification Search
CPC . B60Q 1/18; B60Q 1/02; B60Q 1/085; B60Q 2300/312; B60Q 2300/41; B60Q 2300/45; B60Q 1/1423; B60Q 1/1438; F21S 41/00; F21S 41/141; F21S 41/143; F21S 41/151; F21S 41/153; F21S 41/162; F21S 41/172; F21S 41/675; F21S 41/645; F21S 41/40; F21S 41/67; F21S 41/68; F21S 41/686; F21S 41/692; F21S 41/698;
(Continued)

(56) References Cited

U.S. PATENT DOCUMENTS

| 4,480,291 A | 10/1984 | Dranginis |
| 2009/0086500 A1 | 4/2009 | Tatara |
| 2017/0129393 A1 | 5/2017 | Johnson |

(Continued)

FOREIGN PATENT DOCUMENTS

| DE | 10-2008-025463 | 12/2009 |
| KR | 10-1789652 | 10/2017 |

*Primary Examiner* — Omar Rojas Cadima
(74) *Attorney, Agent, or Firm* — DLA PIPER LLP (US)

(57) ABSTRACT

A lighting apparatus for a vehicle may include: a housing installed inside the front of a vehicle and formed one side thereof with an opening, a plurality of light emitting units installed inside the housing and configured to emit light toward the opening, and a plurality of flap units rotatably installed in the housing, disposed to face the plurality of light emitting units, and configured to open or close the opening.

13 Claims, 25 Drawing Sheets

(51) Int. Cl.
*F21Y 115/10* (2016.01)
*F21S 41/141* (2018.01)

(58) Field of Classification Search
CPC ............ F21Y 2115/10; F21W 2102/13; F21W 2102/135; F21W 2102/18
See application file for complete search history.

(56) References Cited

U.S. PATENT DOCUMENTS

2018/0180243 A1    6/2018   Na
2022/0371507 A1*   11/2022   Kim ..................... F21S 41/689

* cited by examiner

LIGHTING APPARATUS FOR VEHICLE

CROSS-REFERENCE TO RELATED APPLICATION

The present application is a continuation of U.S. patent application Ser. No. 17/568,572 filed Jan. 4, 2022, which claims the benefit of priority to Korean Application No. 10-2021-0064795, filed on May 20, 2021, which are incorporated herein by reference in their entirety.

BACKGROUND

Field

Exemplary embodiments of the present disclosure relate to a lighting apparatus for a vehicle, and more particularly, to a lighting apparatus for a vehicle, capable of transmitting signals to surrounding vehicles, drivers, or pedestrians.

Discussion of the Background

In general, various types of lighting apparatuses are installed in a vehicle to easily check an object located around the vehicle while driving and to notify surrounding vehicles, pedestrians, and the like of the state of the vehicle or transmitting signals to the surrounding vehicles, the pedestrians, and the like.

However, lighting apparatuses in the related art have is a limitation in the type of signals that can be transmitted because they may transmit signals through only turning on and off of an LED, and have a difficulty in clearly transmitting signals because they may transmit only a two-dimensional image. Furthermore, in the case of a daytime situation in which an illumination value outside a vehicle is high, signal transmission by only turning on and off of an LED has a problem in that visibility is poor.

The background art of the present disclosure is disclosed in Korean Patent No. 10-1789652 (registered on Oct. 18, 2017 and entitled "LED Lamp of a Vehicle").

SUMMARY

The present disclosure has been made to solve the above problems, and an object of the present disclosure is to provide a lighting apparatus for a vehicle, capable of transmitting a motion signal based on movement as well as a light emitting signal by light.

In order to solve the above problems, a lighting apparatus for a vehicle in accordance with the present disclosure is includes: a housing installed inside a front of the vehicle and formed one side thereof with an opening; a plurality of light emitting units installed inside the housing and configured to emit light toward the opening; and a plurality of flap units rotatably installed in the housing, disposed to face the plurality of light emitting units, and configured to open or close the opening.

The plurality of light emitting units and the plurality of flap units are each arranged in at least two rows along a width direction of the vehicle.

The plurality of light emitting units are provided so that lighting states thereof are individually adjusted, and the plurality of flap units are provided so that rotational states thereof are individually adjusted.

Each of the plurality of flap units may include: a flap member configured to rotate around a rotating shaft part that crosses the housing in a vertical direction; and a driving part connected to the rotating shaft part and configured to adjust a rotation angle and a rotation direction of the flap member by generating a driving force.

The flap member rotates to an inside of the housing at a set angle to open the opening in a state in which a front surface of the flap member is disposed in parallel to a width direction of the vehicle.

The set angle at which the flap member rotates to the inside of the housing is equal to or less than 90°.

A front surface of the flap member has a color different from an inner color of the housing or a surface color of the plurality of light emitting units so that color inversion is performed when the flap member rotates.

The plurality of light emitting units may be installed in the housing to be movable in a front or rear direction of the vehicle.

Each of the plurality of light emitting units may include: a light source part provided to be turned on and off; a heat sink part configured to support the light source part and discharge heat generated from the light source part; a reflector part configured to reflect light, which is emitted from the light source part, to one side; and a lens part configured to form a light distribution pattern by transmitting light, which is reflected from the reflector part, toward the opening.

The lighting apparatus for a vehicle may further include a display unit installed in the housing and configured to display a set color to an outside of the vehicle as the plurality of flap units open the opening.

The display unit may be disposed on a bottom surface of the housing and coated with the set color.

The display unit may include a luminous or fluorescent material.

The lighting apparatus for a vehicle may further include a reflection unit installed on the plurality of flap units configured to reflect the set color, which is displayed by the display unit, toward the outside of the vehicle when the plurality of flap units open the opening.

The lighting apparatus for a vehicle may further include: a sensing unit configured to sense a distance between the vehicle and a pedestrian or a driver; and a control unit configured to receive sensed information from the sensing unit and transmit a light emitting unit turning-on signal for turning on the plurality of light emitting units and a flap unit control signal for rotating the plurality of flap units.

When the distance between the vehicle and the pedestrian is within a first set distance, the control unit transmits the light emitting unit turning-on signal and the flap unit control signal to the plurality of light emitting units and the plurality of flap units, respectively, so that the plurality of light emitting units and the plurality of flap units notify the pedestrian of a walking direction.

When the distance between the distance between the vehicle and the driver is within a second set distance, the control unit transmits the light emitting unit turning-on signal and the flap unit control signal to the plurality of light emitting units and the plurality of flap units, respectively, so that the plurality of light emitting units and the plurality of flap units generate a welcome signal.

When the distance between the vehicle and the driver is out of a second set distance, the control unit transmits the light emitting unit turning-on signal and the flap unit control signal to the plurality of light emitting units and the plurality of flap units, respectively, so that the plurality of light emitting units and the plurality of flap units generate a goodbye signal.

A lighting apparatus for a vehicle in accordance with the present disclosure may transmit various types of signals to surrounding vehicles, drivers, or pedestrians by a combination of light emitting signals from a plurality of light emitting units and motion signals from a plurality of flap units, and further enhance visibility in a daytime situation.

According to the lighting apparatus for a vehicle in accordance with the present disclosure, as the turning-on states of the plurality of light emitting units and the rotation states of the plurality of flap units may be individually adjusted to implement a dynamic image, which enables more efficient and intuitive signal transmission.

Furthermore, according to the lighting apparatus for a vehicle in accordance with the present disclosure, as the flap units are disposed to interfere with light emitted from the light emitting units, a shading effect may be given to light emitting signals, which makes it possible to improve aesthetics.

Furthermore, the lighting apparatus for a vehicle in accordance with the present disclosure may transmit more visually clear signals to surrounding vehicles, drivers, or pedestrians as a display unit displays a set color to the outside of a vehicle when an opening is opened.

Furthermore, according to the lighting apparatus for a vehicle in accordance with the present disclosure, a reflection unit reflects a set color displayed by the display unit, which makes it possible to secure visibility and produce a more luxurious image.

According to a method of controlling a lighting apparatus for a vehicle in accordance with the present disclosure, light emitting units and flap units are operated on the basis of a distance between a vehicle and a pedestrian, to notify the walking direction, which makes it possible to more clearly transmit signals and prevent safety accidents due to inconsistency in communication with pedestrians.

DETAILED DESCRIPTION OF THE ILLUSTRATED EMBODIMENTS

Figure 1:
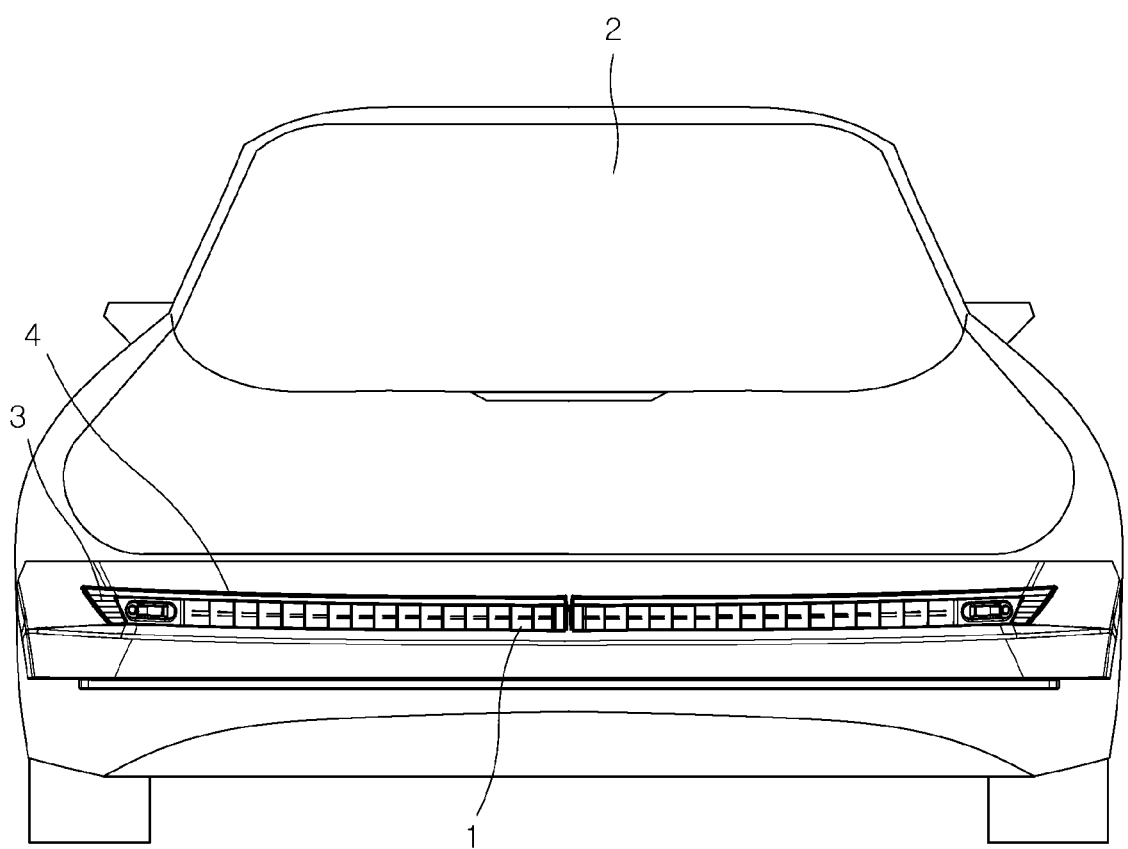
FIG. 1 and FIG. 2 are diagrams schematically illustrating an installation state of a lighting apparatus for a vehicle in accordance with an embodiment of the present disclosure.

Hereinafter, embodiments of a lighting apparatus for a vehicle in accordance with the present disclosure will be described with reference to the accompanying drawings.

In this process, the thicknesses of lines or the sizes of elements illustrated in the drawings may be exaggerated for the purpose of clarity and convenience of explanation. Furthermore, terms to be described later are terms defined in consideration of functions thereof in the present disclosure and may be changed according to the intention of a user or an operator, or practice. Accordingly, such terms should be defined based on the disclosure over the present specification.

Furthermore, in the present specification, when a certain part is referred to as being 'connected (or coupled) to' another part, it may indicate that the former part is directly connected (or coupled) to the latter part or indirectly connected (or coupled) to the latter part with another part interposed therebetween. In the present specification, when a certain part "includes (or comprises)" a certain component, it means that the element does not exclude another component but may further "include (or comprise)" another component, unless referred to the contrary.

Figure 2:
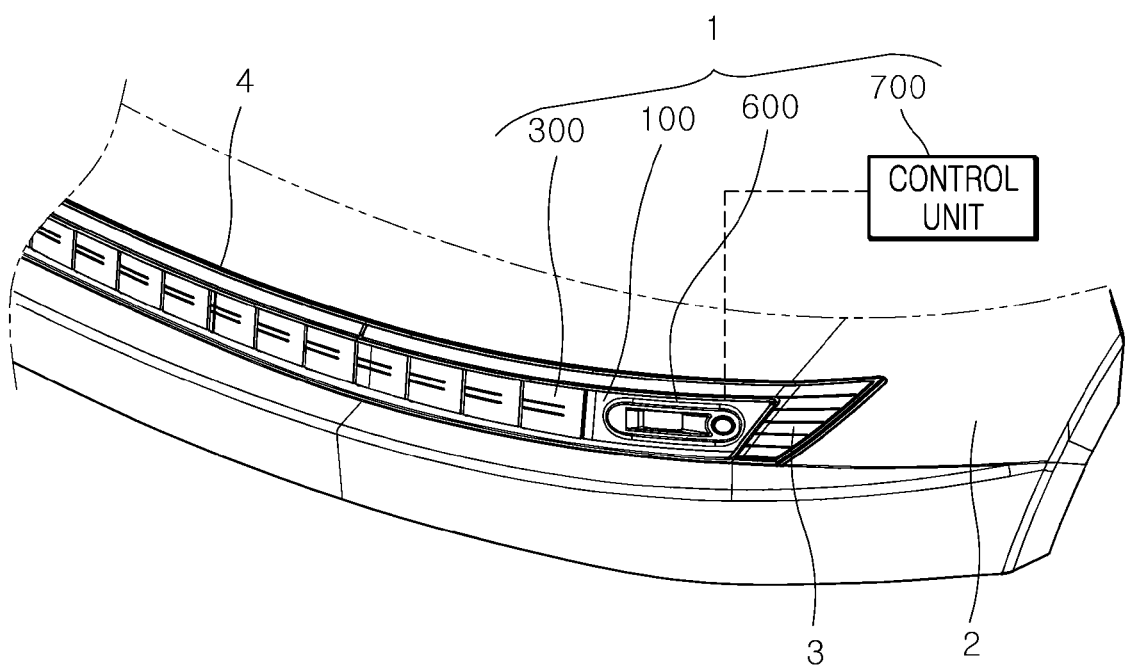
Figure 3:
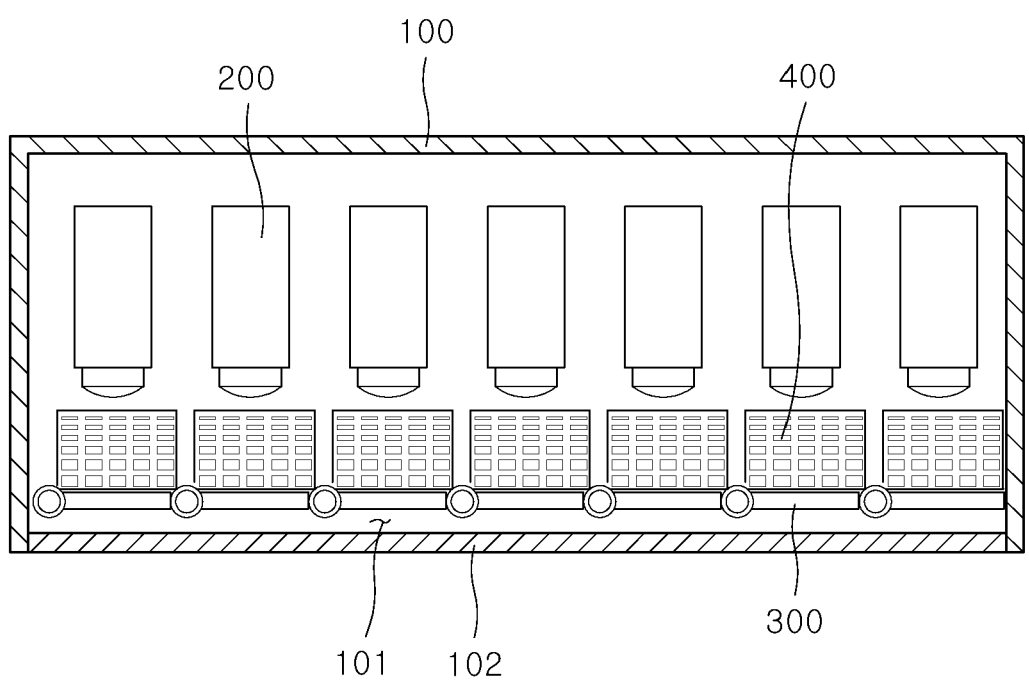
FIG. 3 and FIG. 4 are plan views schematically illustrating the configuration of the lighting apparatus for a vehicle in accordance with an embodiment of the present disclosure.
Figure 4:
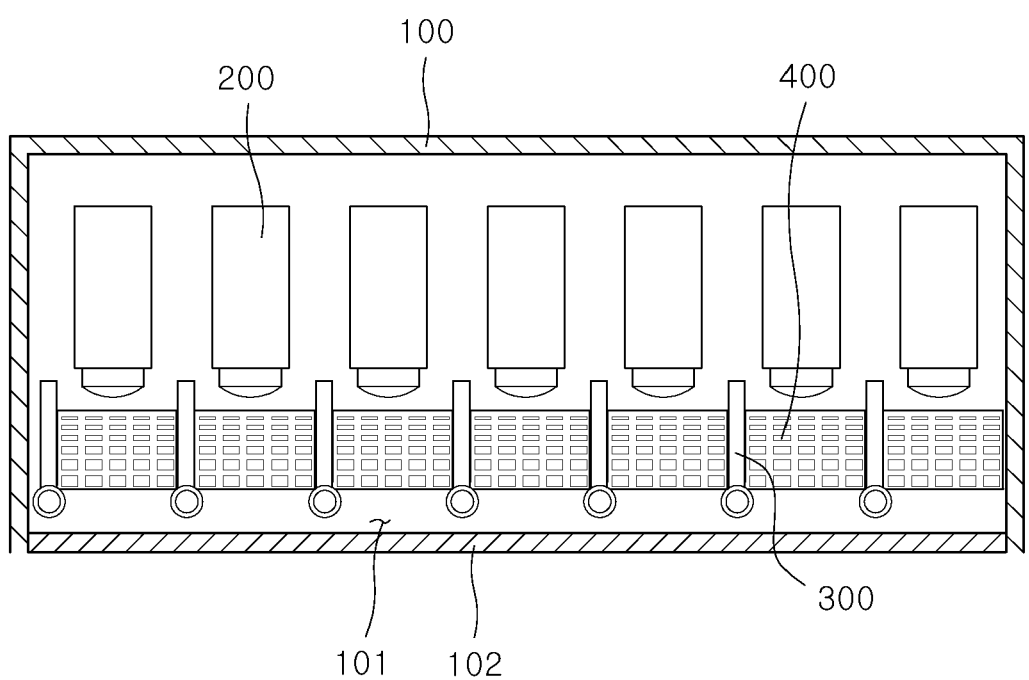
Figure 5:
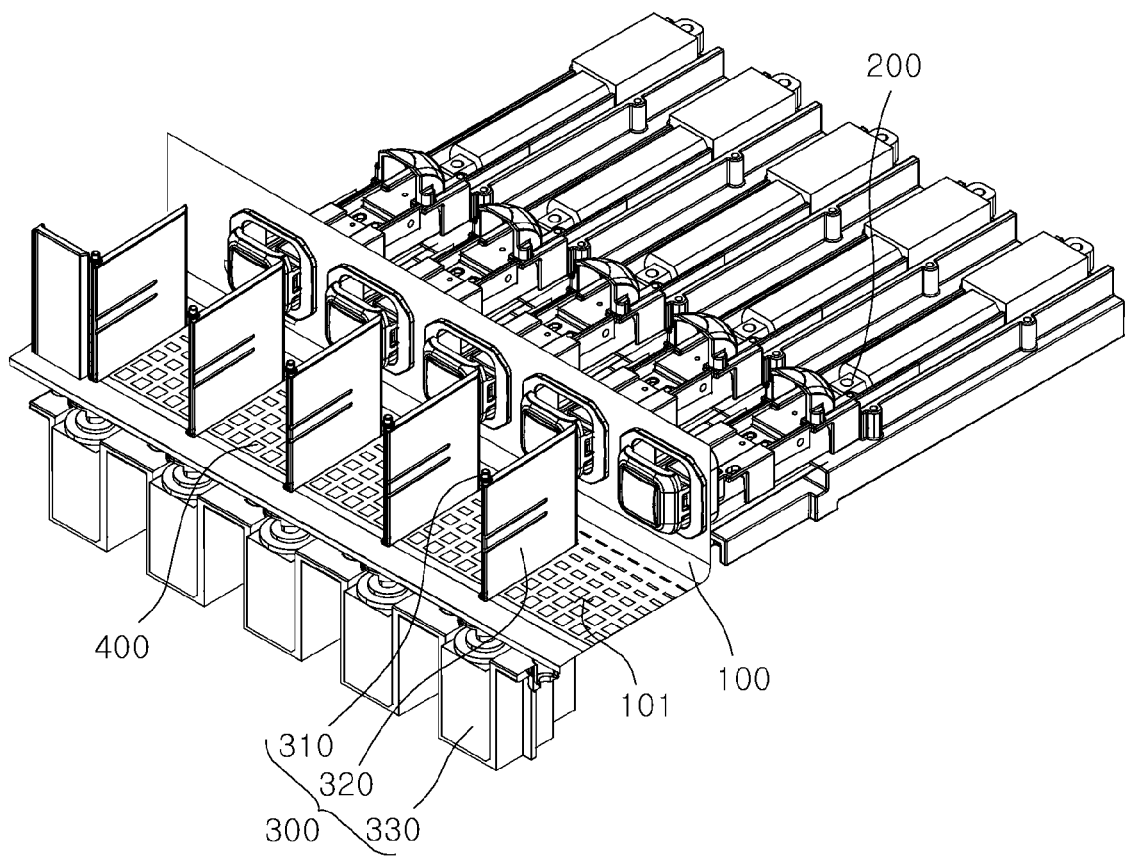
FIG. 5 is a perspective view schematically illustrating a configuration of the lighting apparatus for a vehicle in accordance with an embodiment of the present disclosure.
Figure 6:
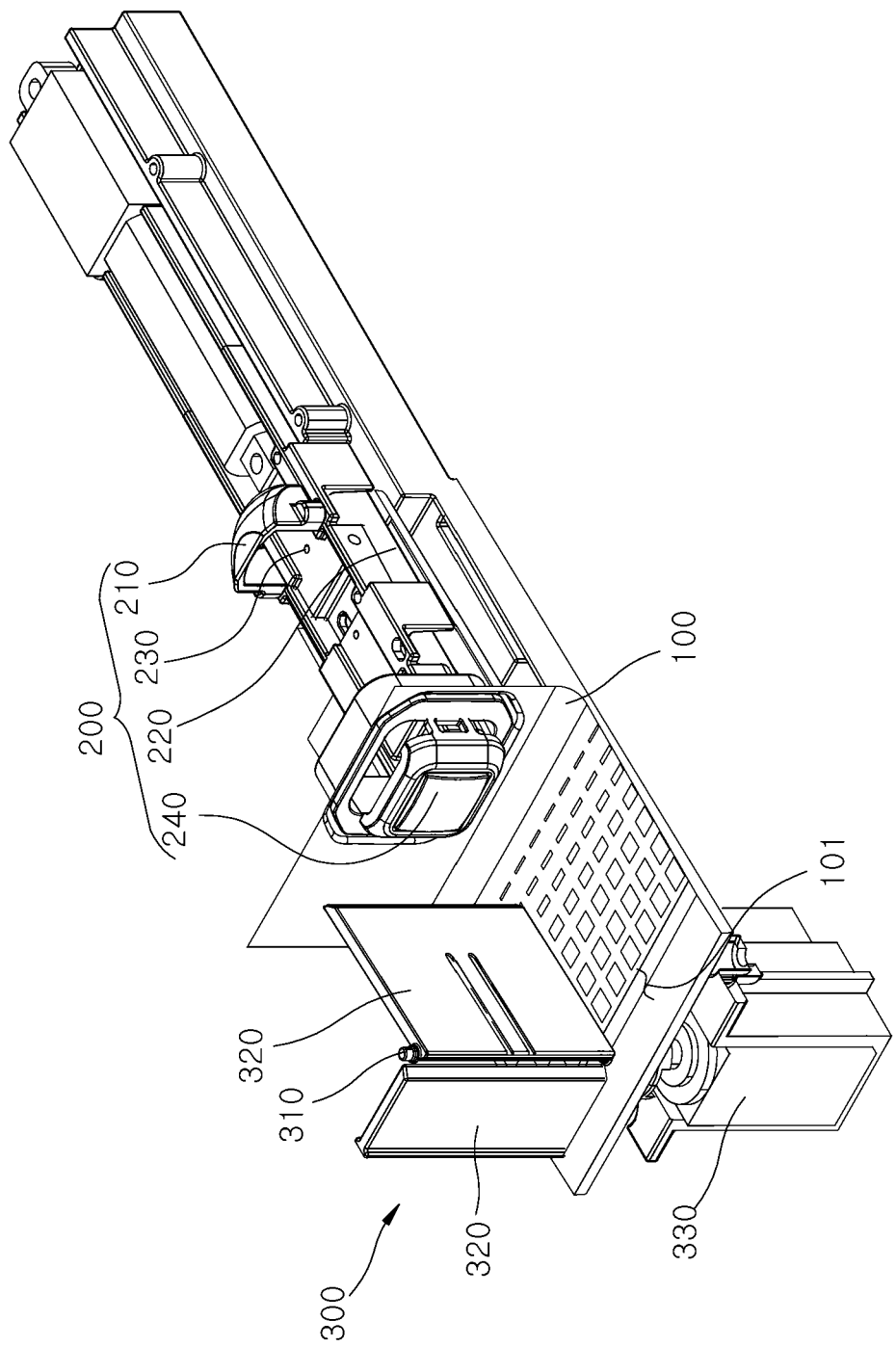
FIG. 6 is an enlarged perspective view schematically illustrating the configuration of the lighting apparatus for a vehicle in accordance with an embodiment of the present disclosure.

Furthermore, substantially the same reference numerals may refer to substantially the same components throughout the present specification. Even though substantially the same reference numerals or similar reference numerals are not mentioned or described in a specific drawing, the reference numerals may be described based on other drawings. Furthermore, even though there is a portion which is not indicated by reference numerals in a specific drawing, the portion may be described based on other drawings. Furthermore, the number, shapes, and sizes of detailed components included in the drawings of the present application and relative differences in the sizes are set for convenience of understanding, and do not limit embodiments and may be implemented in various forms FIG. 1 and FIG. 2 are diagrams schematically illustrating an installation state of a lighting apparatus 1 for a vehicle in accordance with an embodiment of the present disclosure, FIG. 3 and FIG. 4 are plan views schematically illustrating the configuration of the lighting apparatus for a vehicle in accordance with an embodiment of the present disclosure, FIG. 5 is a perspective view schematically illustrating a configuration of the lighting apparatus for a vehicle in accordance with an embodiment of the present disclosure, and FIG. 6 is an enlarged perspective view schematically illustrating the configuration of the lighting apparatus 1 for a vehicle in accordance with an embodiment of the present disclosure.

Referring to FIG. 1 to FIG. 6, the lighting apparatus 1 for a vehicle in accordance with an embodiment of the present disclosure includes a housing 100, a light emitting unit 200, a flap unit 300, a display unit 400, a reflection unit 500, a sensing unit 600, and a control unit 700.

The housing 100 is installed inside the front of a vehicle 2 and supports the light emitting unit 200 and the flap unit 300 to be described below. The housing 100 in accordance with an embodiment of the present disclosure is formed in the form of a box with an empty interior and is installed inside a bumper provided on the front of the vehicle 2. A detailed shape of the housing 100 is not limited to the shape illustrated in FIG. 1 to FIG. 6, and the housing 100 may be variously changed in design within the technical idea of a shape in which it may be installed inside the front of the vehicle 2 and support the light emitting unit 200 and the flap unit 300 to be described below.

An opening 101 is formed on one side of the housing 100. The opening 101 in accordance with an embodiment of the present disclosure is formed in the form of a through hole disposed in front of the housing 100 and communicates the inside of the housing 100 with the outside of the front of the vehicle 2. The cross-section of the opening 101 is formed to have a shape corresponding to the cross-sectional shape of the front of the housing 100. The opening 101 extends across the width direction of the housing 100, that is, the left-right direction of the vehicle 2.

A blocking unit 102 may be installed in front of the opening 101 to substantially prevent foreign substances such as dust and moisture from entering the housing 100. The blocking unit 102 in accordance with an embodiment of the present disclosure is formed to have a plate shape and is disposed to face the opening 101. The blocking unit 102 may include a transparent material such as polycarbonate (PC) so that light emitted from the light emitting unit 200 to be described below may be emitted to the outside of the vehicle.

A pair of direction indicator lights 3 are installed on both sides of an upper end of the housing 100 to be turned on/off at a set cycle according to a driver's operation and inform surrounding vehicles or pedestrians of the turning direction of the vehicle.

A daytime running light 4, which is turned on separately from the light emitting unit 200 to be described below, is installed between the pair of direction indicator lights 3 so that surrounding vehicles or pedestrians may easily recognize the vehicle 2 during daytime driving.

The light emitting unit 200 is installed inside the rear of the housing 100, and emits light toward the opening 101. The light emitting unit 200 may be installed to be movable in the front or rear direction of the vehicle 2 inside the housing 100. Accordingly, the light emitting unit 200 may adjust a light distribution angle of the light emitted to the outside of the vehicle 2 through the opening 101. The light emitting unit 200 may be provided in plural, and a plurality of light emitting units 200 may be arranged in at least two rows along the width direction of the vehicle 2 and the housing 100. The plurality of light emitting units 200 are provided so that turning-on states thereof may be individually adjusted. Accordingly, the plurality of light emitting units 200 may be sequentially or randomly turned on, and may transmit light emitting signals to surrounding vehicles, drivers, or pedestrians.

The light emitting unit 200 in accordance with an embodiment of the present disclosure includes a light source part 210, a heat sink part 220, a reflector part 230, and a lens part 240.

The light source part 210 is installed on the heat sink part 220 to be described below, and is provided to be turned on and off by receiving power from the outside. The light source part 210 in accordance with an embodiment of the present disclosure may include at least one LED that is turned on and off by receiving power from the outside.

The heat sink part 220 supports the light source part 210 and discharges heat generated from the light source part 210 to the outside of the housing 100. The heat sink part 220 in accordance with an embodiment of the present disclosure is installed on an opposite side of the opening 101 in the inside of the housing 100, that is, behind the housing 100. The heat sink part 220 is formed so that the light source part 210 may be installed on an upper surface of the heat sink part 220. A plurality of heat dissipation pins (not illustrated) are provided in the heat sink part 220 to receive heat, which is generated by the turning-on of the light source part 210, by conduction. The heat sink part 220 discharges heat, which is transmitted to the plurality of heat dissipation pins, to the outside of the housing 100 by a convection action with the outside of the housing 100.

The reflector part 230 is disposed to face the light source part 210 and reflects light, which is emitted from the light source part 210, to one side. The reflector part 230 in accordance with an embodiment of the present disclosure is formed in a spherical shape having a predetermined curvature and is disposed so that an inner side thereof faces the light source part 210. The inner side of the reflector part 230 may include a material having a high reflectance to reflect light emitted from the light source part 210. The reflector part 230 is formed to have an open front and reflects light, which is emitted from the light source part 210, toward the front of the housing 100.

The lens part 240 forms a light distribution pattern by transmitting light, which is reflected from the reflector part 230, toward the opening 101. The lens part 240 in accordance with an embodiment of the present disclosure is disposed on a reflection path of light reflected from the reflector part 230. The lens part 240 is disposed between the opening 101 and the reflector part 230 and is spaced apart from the reflector part 230 by a predetermined interval toward the front of the housing 100. The lens part 240 may include a transparent material such as glass or plastic so that light reflected from the reflector part 230 may be transmitted. The lens part 240 transmits light, which is reflected from the reflector part 230, through the opening 101 and forms a light distribution pattern such as a low beam or high beam pattern in front of the vehicle 2. A detailed shape of the lens part 240 may be changed in design to shapes of various types of lenses such as an aspherical lens according to the light irradiation range, a light distribution pattern, and the like.

The flap unit 300 is rotatably installed in the housing 100 to open or close the opening 101. The flap unit 300 opens or closes the opening 101 and transmits signals based on movement to surrounding vehicles, drivers, or pedestrians. Accordingly, the flap unit 300 may secure visibility even in a daytime situation in which it is difficult to identify light through the light emitting unit 200. The flap unit 300 is disposed to face the light emitting unit 200 to interfere with light emitted from the light emitting unit 200 when opening or closing the opening 101. Accordingly, the flap unit 300 may transmit various types of signals together with the light emitting unit 200, and may further enhance the visibility of surrounding vehicles, drivers, or pedestrians by varying the amount of light emitted from the light emitting unit 200. The flap unit 300 may be provided in plural, and a plurality of flap units 300 may be arranged in at least two rows along the width direction of the vehicle 2 and the housing 100. The plurality of flap units 300 are provided so that rotational states thereof are individually adjusted. Accordingly, the plurality of flap units 300 may sequentially rotate to transmit predetermined direction signals to pedestrians. Furthermore, the flap units 300 may be substantially maintained in states having different rotation angles, and may improve visibility and aesthetics of light emitted from the light emitting unit 200 by giving a shading effect to the light emitted from the light emitting unit 200.

The flap unit 300 in accordance with an embodiment of the present disclosure includes a rotating shaft part 310, a flap member 320, and a driving part 330.

The rotating shaft part 310 is rotatably installed in the housing 100 to rotate the flap member 320 to be described below. The rotating shaft part 310 in accordance with an embodiment of the present disclosure is formed in the shape of a rotating shaft that vertically crosses the housing 100 in the vertical direction. The rotating shaft part 310 is disposed at a front portion of the housing 100, more specifically, between the opening 101 and the lens part 240. The rotating shaft part 310 is disposed at a position spaced apart from an end on one side of the lens part 240 (left side in FIG. 6) by a predetermined distance. A lower end of the rotating shaft part 310 is connected to the driving part 330 to be described below by penetrating a bottom surface of the housing 100.

The flap member 320 is rotated around the rotating shaft part 310 when the rotating shaft part 310 rotates. The flap member 320 in accordance with an embodiment of the present disclosure is formed in the form of a plate having a rectangular cross-section, and has an end on one side thereof (left side in FIG. 6) connected to an outer peripheral surface of the rotating shaft part 310. When the opening 101 is closed, the front surface of the flap member 320 is disposed in parallel to the width direction of the vehicle 2. The flap member 320 is formed to have a width larger than that of the lens part 240 to completely block light emitted from the lens part 240 when the opening 101 is closed. The flap member 320 rotates to the inside of the housing 100 at a set angle to open the opening 101. The set angle at which the flap member 320 rotates to the inside of the housing 100 may be equal to or less than 90°. The front surface of the flap member 320 may have a color different from an inner color of the housing 100, a surface color of the light emitting unit 200, or a color of light emitted from the light emitting unit 200 so that color inversion is performed when the flap member 320 rotates. Accordingly, the flap member 320 may more effectively notify surrounding vehicles, drivers, or pedestrians that the opening 101 is being opened or closed. The plurality of flap members 320 are disposed to abut the rotating shaft part 310, to which adjacent flap members 320 are connected, when the opening 101 is closed. Accordingly, the flap members 320 may substantially prevent light emitted from the plurality of light emitting units 200 from leaking to the outside when the opening 101 is closed.

The driving part 330 is connected to the rotating shaft part 310 and generates a driving force to adjust the rotation angle and the rotation direction of the flap member 320. The driving part 330 in accordance with an embodiment of the present disclosure may be formed in the form of an electric motor that receives power from the outside and generates a rotational force. The driving part 330 is fixed to the outer bottom surface of the housing 100 and has an output shaft connected to the lower end of the rotating shaft part 310. A reduction gear may be installed between the driving part 330 and the rotating shaft part 310.

The display unit 400 is installed in the housing 100 to display a set color to the outside of the vehicle 2 as the flap unit 300 opens the opening 101. The display unit 400 in accordance with an embodiment of the present disclosure is disposed on the inner bottom surface of the housing 100, which faces the rotation path of the lower end of the flap member 320. The display unit 400 is disposed on the bottom surface of the housing 100 and coated with the set color. More specifically, the display unit 400 may be formed by painting a paint having a set color on or attaching a film having a set color to a bezel that is concavely recessed into the bottom surface of the housing 100. The display unit 400 may be disposed on the bottom surface of the housing 100 and coated by a high glossy method so that the set color is glossy. The display unit 400 may include a luminous or fluorescent material that absorbs light from the outside and emits light having a wavelength longer than that of the absorbed light, so as to display the set color even at night. The set color may be variously changed in design within the range in which colors may be identified by surrounding vehicles or pedestrians from the outside of the vehicle 2. The shape of the display unit 400 is not limited to the shape illustrated in FIG. 5 and may be variously changed in design within the technical idea of a shape capable of displaying the set color.

The reflection unit 500 is installed on the flap unit 300 and reflects the color, which is displayed by the display unit 400, toward the outside of the vehicle 2 when the flap unit 300 opens the opening 101.

Figure 7:
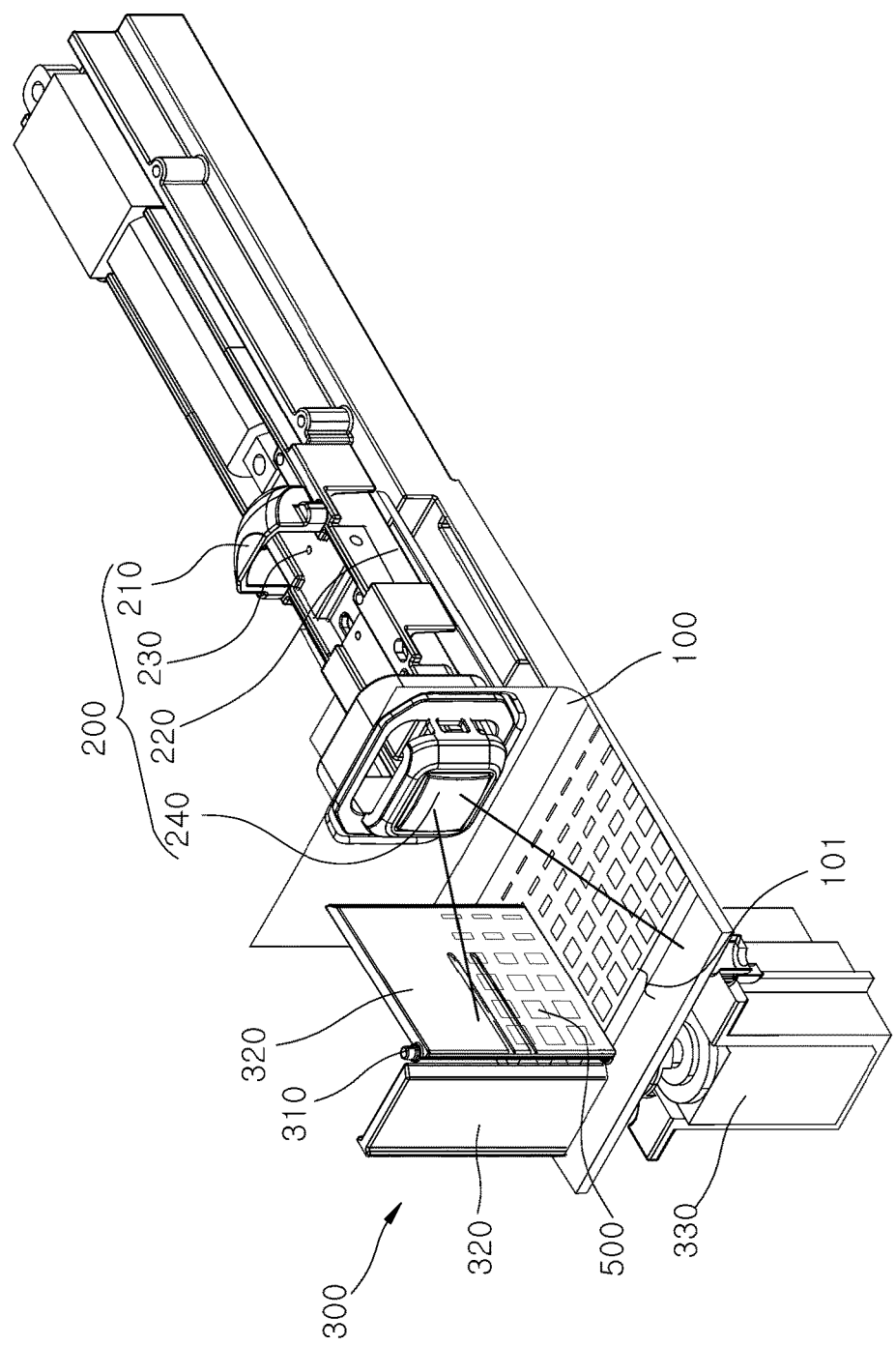
FIG. 7 is a perspective view schematically illustrating a configuration of a reflection unit in accordance with an embodiment of the present disclosure.

FIG. 7 is a perspective view schematically illustrating a configuration of the reflection unit 500 in accordance with an embodiment of the present disclosure.

Referring to FIG. 7, the reflection unit 500 in accordance with an embodiment of the present disclosure is disposed on the front surface of the flap member 320, which perpendicularly faces the display unit 400, when the opening 101 is opened. The reflection unit 500 may be formed integrally with the front surface of the flap member 320 by manufacturing the front surface of the flap member 320 with a material having a high reflectance, or may also be formed by coating the front surface of the flap member 320 with a material having a high reflectance.

Figure 8:
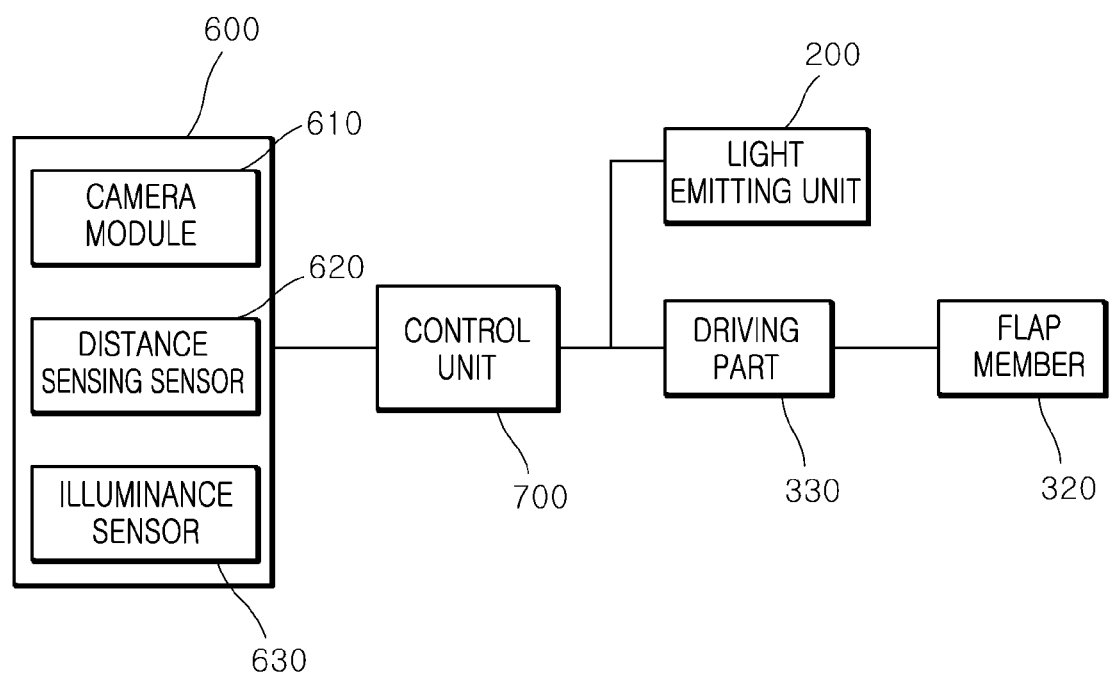
FIG. 8 is a diagram schematically illustrating a configuration of a sensing unit and a control unit in accordance with an embodiment of the present disclosure.

FIG. 8 is a diagram schematically illustrating a configuration of the sensing unit 600 and the control unit 700 in accordance with an embodiment of the present disclosure.

The sensing unit 600 is provided to sense a state around the vehicle and to sense a distance between the vehicle and a pedestrian or a distance between the vehicle and a driver.

The sensing unit 600 in accordance with an embodiment of the present disclosure may include a camera module 610, a distance sensing sensor 620, and an illuminance sensor 630.

The camera module 610 is installed on the front of the vehicle 2 or either side of the housing 100, and captures an image of an area in front of the vehicle 2 to acquire image data for a pedestrian or a driver in front of the vehicle.

The distance sensing sensor 620 senses a distance between the vehicle 2 and a pedestrian or a distance between the vehicle 2 and a driver. The distance sensing sensor 620 may include at least one of various types of sensors capable of measuring a distance such as a Lidar sensor, a laser sensor, and an ultrasonic wave sensor, and sense a distance between the vehicle 2 and a pedestrian or a distance between the vehicle 2 and a driver.

The distance sensing sensor 620 may sense a distance between the vehicle 2 and a driver through a portable terminal carried by the driver. A vehicle smart key may be exemplified as the portable terminal. More specifically, the distance sensing sensor 620 may include a global positioning system (GPS) and sense a relative orientation and a relative distance of the driver's portable terminal to the vehicle 2. Furthermore, when a remote keyless entry (RKE) signal or a passive keyless entry (PKE) signal for remotely opening or closing a door of the vehicle 2 is wirelessly received from the driver's portable terminal, the distance sensing sensor 620 may sense that the driver has approached the vehicle 2 within a predetermined distance.

The illuminance sensor 630 is installed on the vehicle 2 to sense a value of brightness (illuminance) around the vehicle 2.

The control unit 700 receives the sensed information from the sensing unit 600 and transmits a light emitting unit turning-on signal for turning on the light emitting unit 200 and a flap unit control signal for rotating the flap unit 300. More specifically, when the distance between the vehicle 2 and the pedestrian is within a first set distance, the control unit 700 transmits the light emitting unit turning-on signal and the flap unit control signal to the light emitting unit 200 and the flap unit 300, respectively, so that the light emitting unit 200 and the flap unit 300 notify the pedestrian of a walking direction. When the distance between the vehicle 2 and the driver is within a second set distance, the control unit 700 transmits the light emitting unit turning-on signal and the flap unit control signal to the light emitting unit 200 and the flap unit 300, respectively, so that the light emitting unit 200 and the flap unit 300 generate a welcome signal. When the distance between the vehicle 2 and the driver is out of the second set distance, the control unit 700 transmits the light emitting unit turning-on signal and the flap unit control signal to the light emitting unit 200 and the flap unit 300, respectively, so that the light emitting unit 200 and the flap unit 300 generate a goodbye signal. The first set distance and the second set distance variously be changed in design within the range of a distance spaced apart from the vehicle 2. As the control unit 700 in accordance with an embodiment of the present disclosure, a microprocessor, an electronic control unit (ECU), and the like that may be exemplified which are connected to the light emitting unit 200 and the driving part 330, receive the sensed information from the sensing unit 600, and transmit the light emitting unit turning-on signal and the flap unit control signal to the light emitting unit 200 and the flap unit 300, respectively.

Hereinafter, a method of controlling the lighting apparatus for a vehicle in accordance with an embodiment of the present disclosure will be described.

In this process, the drawing illustrates the method divided into a plurality of steps, but at least some steps may be changed in order, may be performed in combination with other steps, may be omitted, may be performed as subdivided steps, or may be performed by adding at least one step (not illustrated) thereto.

Figure 9:
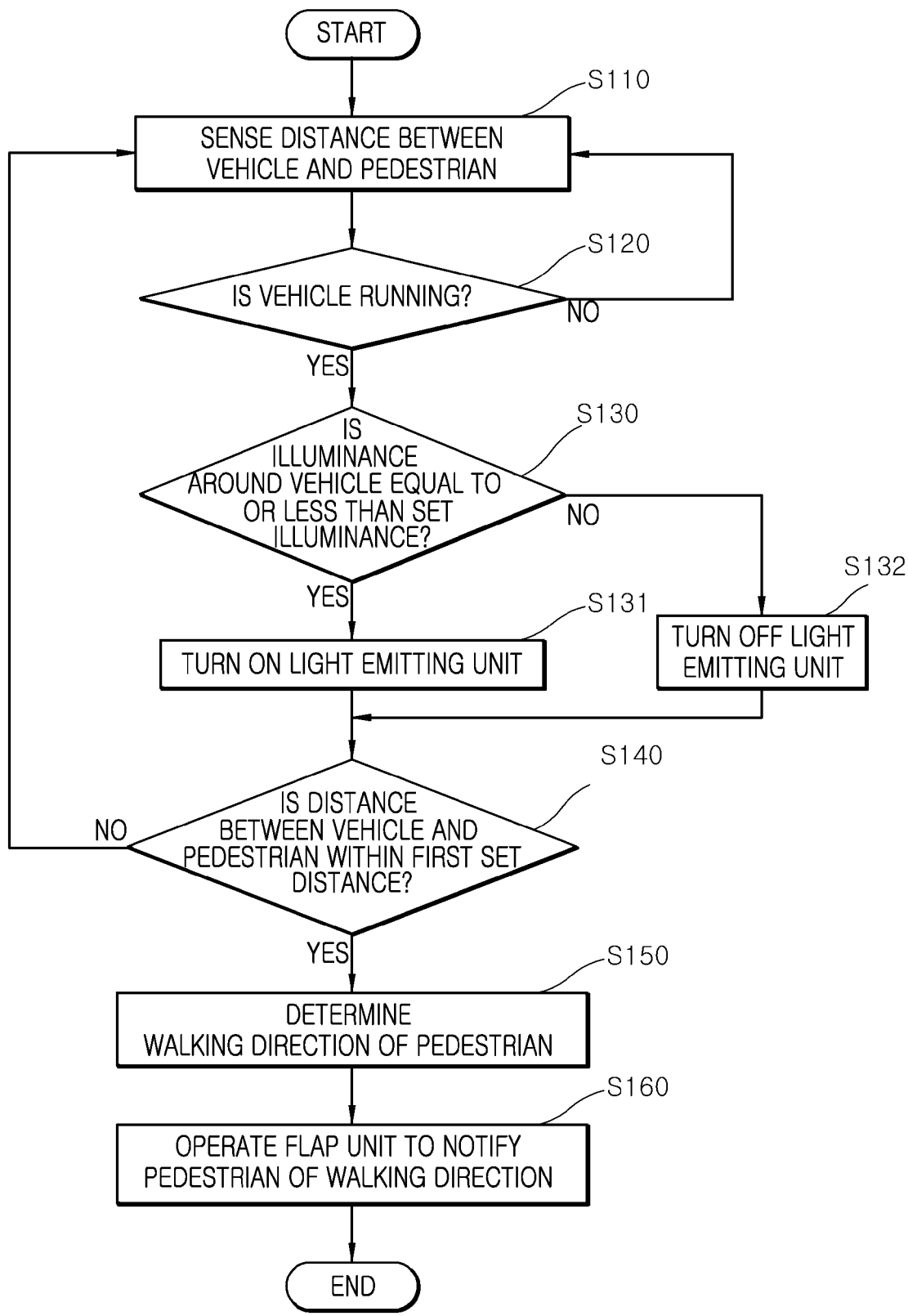
FIG. 9 is a flowchart schematically illustrating a sequence of a method of controlling the lighting apparatus for a vehicle in accordance with an embodiment of the present disclosure.

FIG. 9 is a flowchart schematically illustrating a sequence of the method of controlling the lighting apparatus for a vehicle in accordance with an embodiment of the present disclosure, and FIG. 9 to FIG. 12 are operational diagrams schematically illustrating an operation process of the method of controlling the lighting apparatus for a vehicle in accordance with an embodiment of the present disclosure.

Referring to FIG. 9, the sensing unit 600 senses the distance between the vehicle 2 and a pedestrian (S110). More specifically, the sensing unit 600 recognizes the pedestrian in front of the vehicle 2 through the camera module 610, and measures the distance between the vehicle 2 and the pedestrian through the distance sensing sensor 620.

The control unit 700 determines whether the vehicle 2 is running (S120). More specifically, the control unit 700 determines whether the vehicle 2 is currently running by checking whether the vehicle 2 is started, the operating state of a gear of the vehicle 2, on/off of an autonomous mode, and the like.

The control unit 700 turns on or off the light emitting unit 200 on the basis of a set illuminance value around the vehicle 2 (S130). More specifically, when the illuminance value around the vehicle measured by the illuminance sensor 630 is equal to or less than the set illuminance value, the control unit 700 transmits the light emitting unit turning-on signal to the light emitting units 200 and turns on the light emitting units 200 (S131). At the same time, the control unit 700 rotates the flap units 300 and opens the opening 101. When the illuminance value around the vehicle measured by the illuminance sensor 630 exceeds the set illuminance value, the control unit 700 stops transmitting the light emitting unit turning-on signal to the light emitting units 200 and turns off the light emitting units 200 (S132). In such a case, turning off the light emitting units 200 may mean not only turning off turned-on light emitting units 200 but also substantially maintaining turned-off light emitting units 200 in a turned-off state. The set illuminance value may be variously changed in design in consideration of driver's visibility distance, and the like.

Step S120 and step S130 may be sequentially performed after step S110 as illustrated in FIG. 9, and alternatively, may be performed simultaneously with step S110 or may also be performed in a different order.

When it is determined in step S120 that the vehicle 2 is in a running state, the control unit 700 determines whether the distance between the vehicle 2 and the pedestrian sensed in step S110 is within the first set distance (S140).

When it is determined by the control unit 700 in step S140 that the distance between the vehicle 2 and the pedestrian is within the first set distance, the control unit 700 determines the walking direction of the pedestrian (S150).

After determining the walking direction of the pedestrian in step S150, the control unit 700 operates the flap units 300 to notify the pedestrian of the walking direction (S160). More specifically, the control unit 700 transmits the flap unit control signal to the flap units 300 to sequentially rotate the flap units 300 in a direction parallel to the walking direction of the pedestrian. The plurality of flap units 300 open or close the opening 101 in the direction parallel to the walking direction of the pedestrian, and notify the pedestrian of the walking direction.

Figure 10:
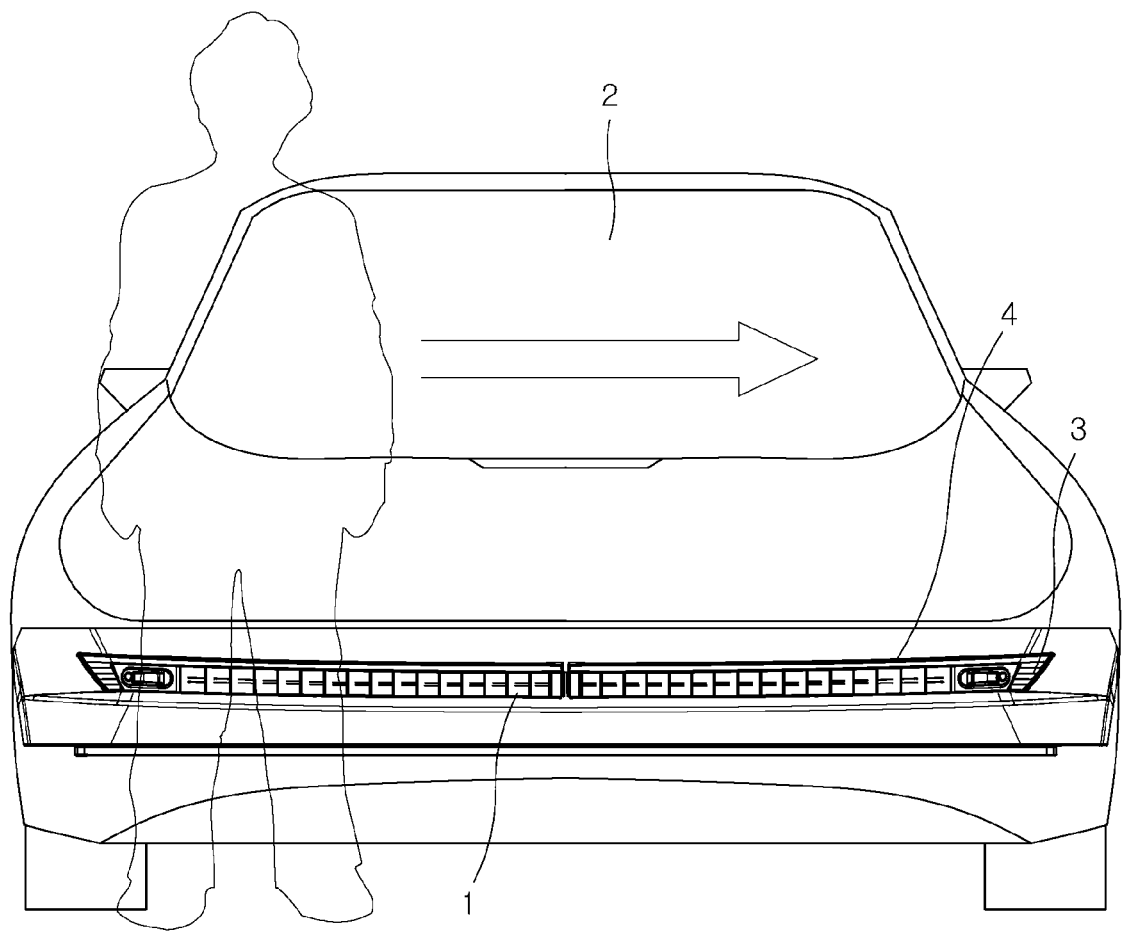
FIG. 10 to FIG. 12 are operational diagrams schematically illustrating an operation process of the method of controlling the lighting apparatus for a vehicle in accordance with an embodiment of the present disclosure.
Figure 11:
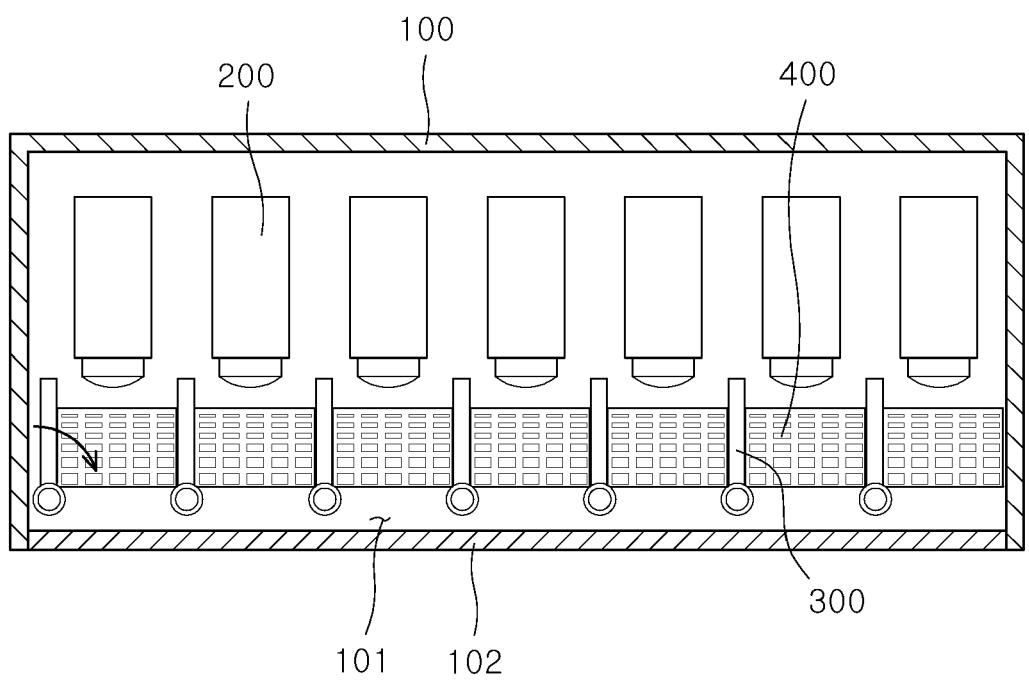
Figure 12:
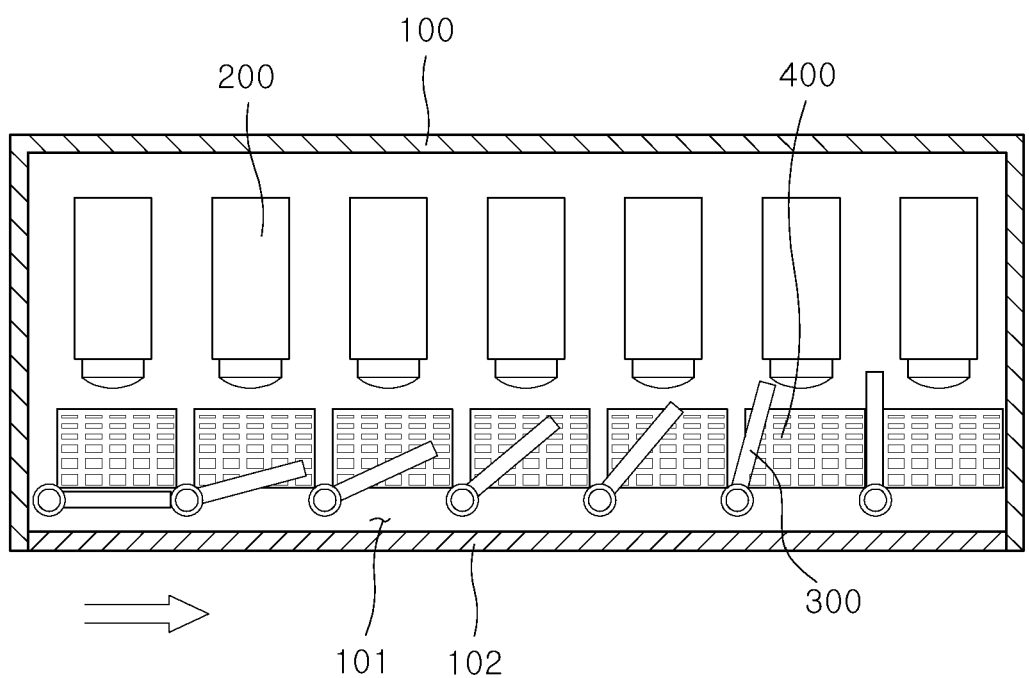

For example, when the control unit 700 determines that the pedestrian walks in a direction from left to right as illustrated in FIG. 10, the control unit 700 sequentially operate the plurality of driving parts 330 in the order of the driving parts 330 disposed on the left side to the driving parts 330 disposed on the right side. In conjunction with this operation, the plurality of flap members 320 are sequentially rotated in the order of the flap members 320 disposed on the left side to the flap members 320 disposed on the right side. When the plurality of flap members 320 are rotated while the opening 101 is opened, the plurality of flap members 320 sequentially close the opening 101 from left to right, and transmit a walking signal to guide the pedestrian to walk from left to right.

When the flap unit 300 opens or closes the opening 101, color inversion is performed because the front surface of the flap member 320 has a color different from the inner color of the housing 100, the surface color of the light emitting unit 200, or the color of light emitted from the light emitting unit 200.

Furthermore, when the flap unit 300 opens the opening 101, the display unit 400 displays a set color to the outside of the vehicle 2, and the reflection unit 500 reflects the set color, which is displayed by the display unit 400, toward the outside of the vehicle 2.

Hereinafter, a method of controlling the lighting apparatus for a vehicle in accordance with another embodiment of the present disclosure will be described.

Figure 13:
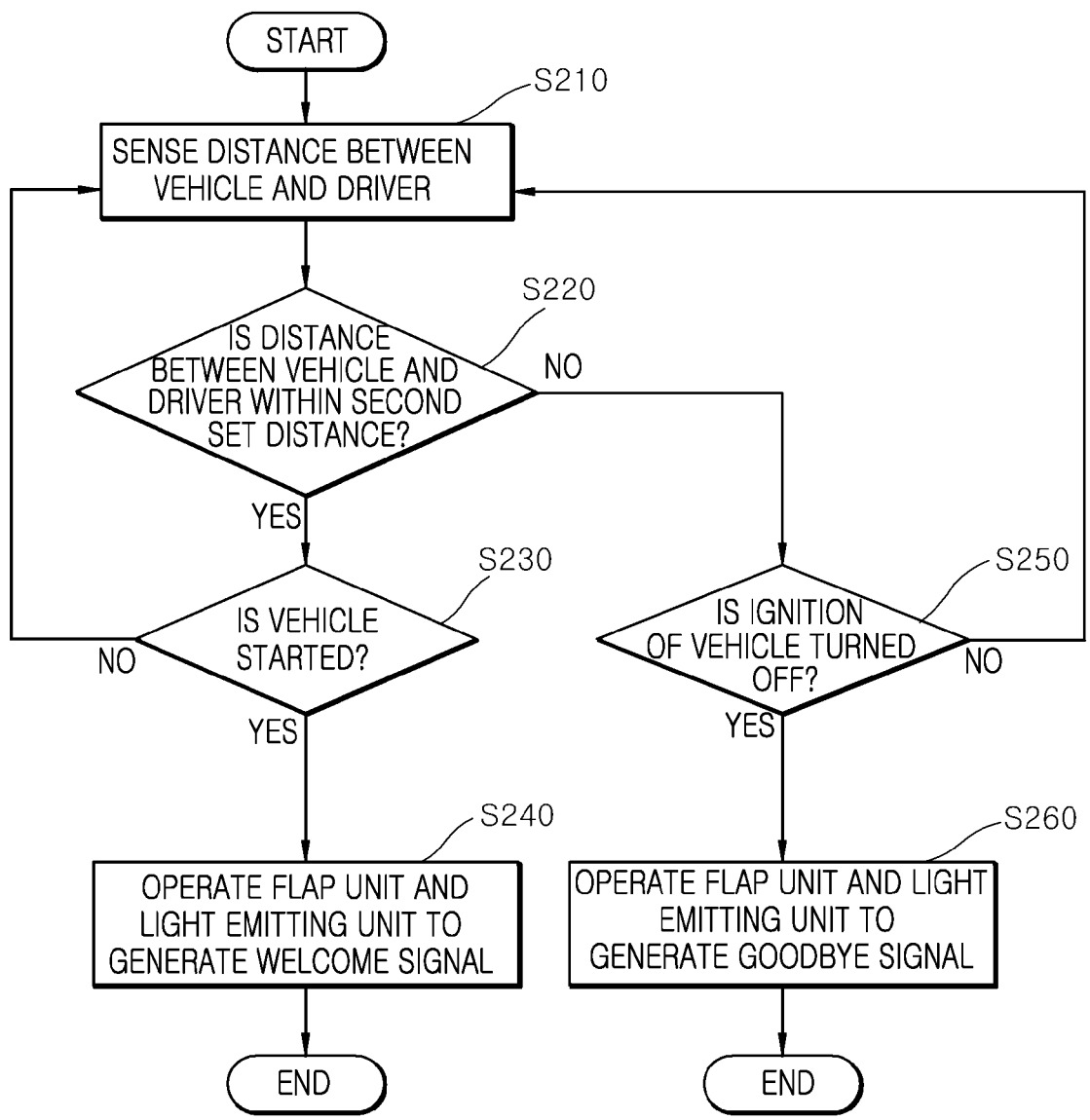
FIG. 13 is a flowchart schematically illustrating a sequence of a method of controlling the lighting apparatus for a vehicle in accordance with another embodiment of the present disclosure.

FIG. 13 is a flowchart schematically illustrating a sequence of the method of controlling the lighting apparatus for a vehicle in accordance with another embodiment of the present disclosure.

Referring to FIG. 13, the sensing unit 600 senses the distance between the vehicle 2 and a driver (S210). More specifically, the sensing unit 600 senses the distance between a portable terminal carried by the driver and the vehicle 2 through the distance sensing sensor 620. The distance sensing sensor 620 may include a global positioning system (GPS) and sense a relative orientation and a relative distance of the driver's portable terminal to the vehicle 2. Furthermore, when a remote keyless entry (RKE) signal or a passive keyless entry (PKE) signal for remotely opening or closing the door of the vehicle 2 is wirelessly received from the driver's portable terminal, the distance sensing sensor 620 may sense that the driver has approached the vehicle 2 within a predetermined distance.

The control unit 700 determines whether the distance between the vehicle 2 and the driver sensed in step S210 is within the second set distance (S220).

When it is determined by the control unit 700 in step S220 that the distance between the vehicle 2 and the driver is within the second set distance, the control unit 700 determines whether the vehicle 2 is started or the ignition of the vehicle is turned off (S230).

When it is determined in step S230 that the vehicle 2 is started, the control unit 700 operates the flap units 300 and the light emitting units 200 to generate a welcome signal (S240). The control unit 700 may turn on/off the direction indicator lights 3 a set number of times before operating the flap units 300 and the light emitting units 200. Twice may be exemplified as the set number of times.

Figure 14:
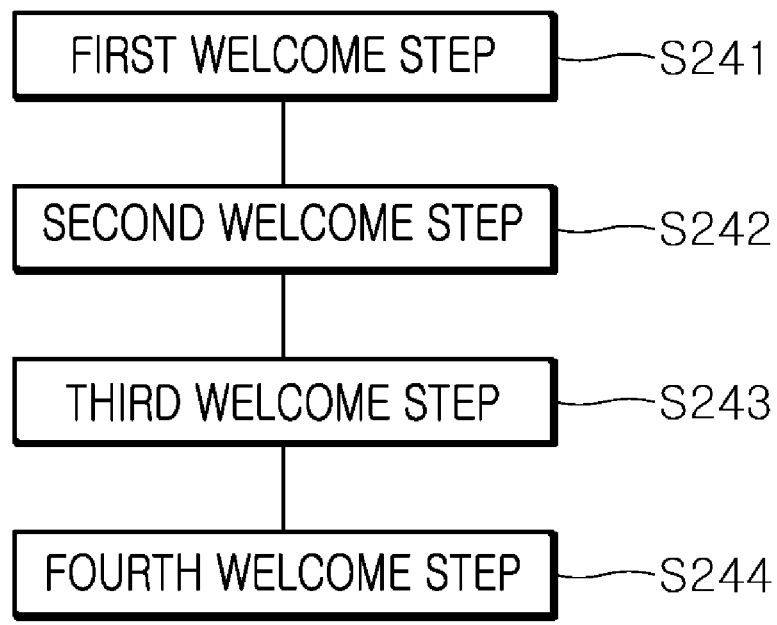
FIG. 14 is a flowchart schematically illustrating a sequence in which flap units and light emitting units generate a welcome signal in accordance with an embodiment of the present disclosure.

FIG. 14 is a flowchart schematically illustrating a sequence in which the flap units 300 and the light emitting units 200 generate the welcome signal in accordance with an embodiment of the present disclosure.

Referring to FIG. 14, the step S240 of generating the welcome signal includes a first welcome step S241, a second welcome step S242, a third welcome step S243, and a fourth welcome step S244.

Figure 15:
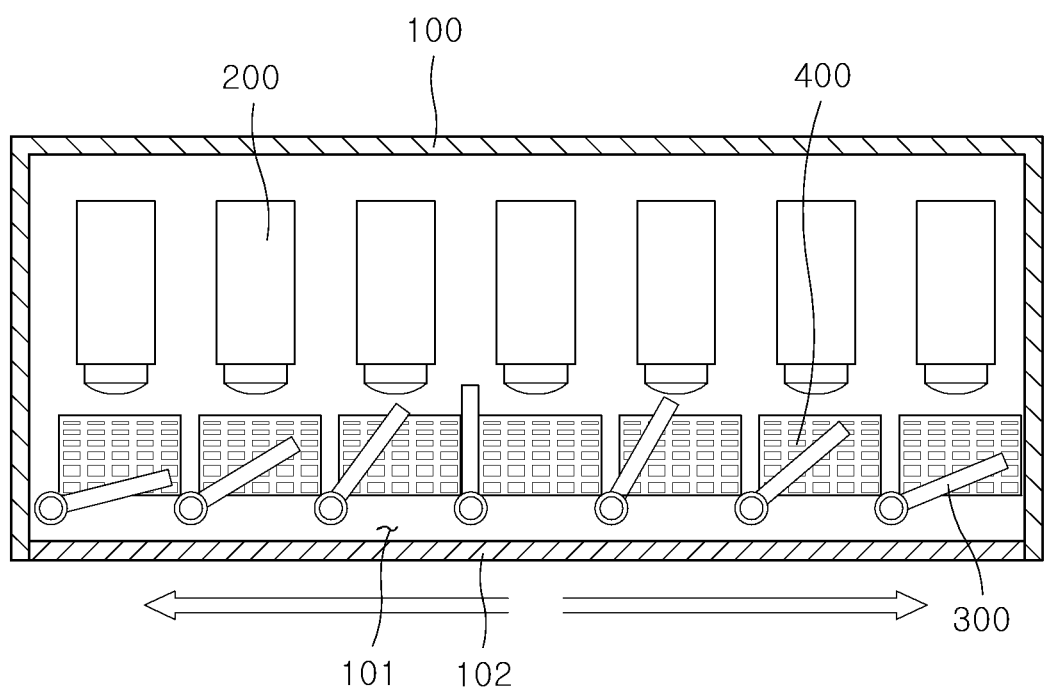
FIG. 15 is an operational diagram schematically illustrating an operation process of a first welcome step in accordance with an embodiment of the present disclosure.

FIG. 15 is an operational diagram schematically illustrating an operation process of the first welcome step in accordance with an embodiment of the present disclosure.

In the first welcome step S241, the control unit 700 opens the opening 101 by sequentially rotating the plurality of flap units 300 in a direction from the center to both ends of the opening 101. More specifically, first, the control unit 700 rotates the flap unit 300 located in the center. Then, the control unit 700 sequentially rotates the flap units 300, which are disposed at the left and right sides of the flap unit 300 located in the center, with a predetermined time difference. Accordingly, the opening 101 is opened in a form that spreads toward both ends from the center.

Figure 16:
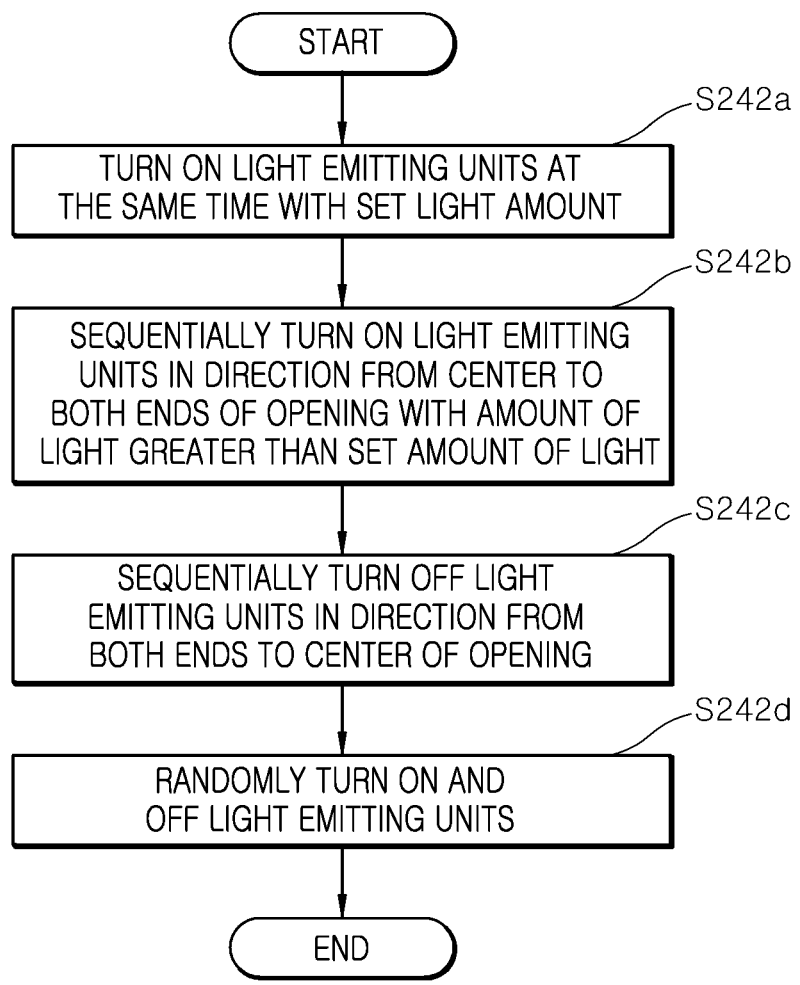
FIG. 16 is a flowchart schematically illustrating a sequence of a second welcome step in accordance with an embodiment of the present disclosure.
Figure 17:
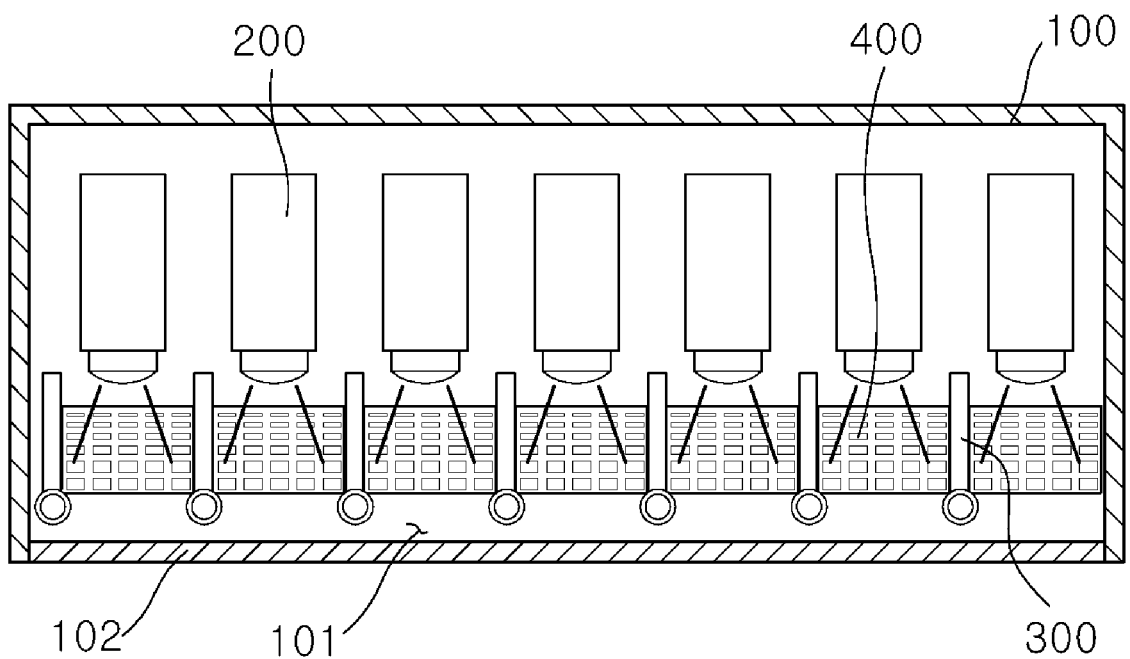
FIG. 17 to FIG. 20 are operational diagrams schematically illustrating an operation process of the second welcome step in accordance with an embodiment of the present disclosure.
Figure 18:
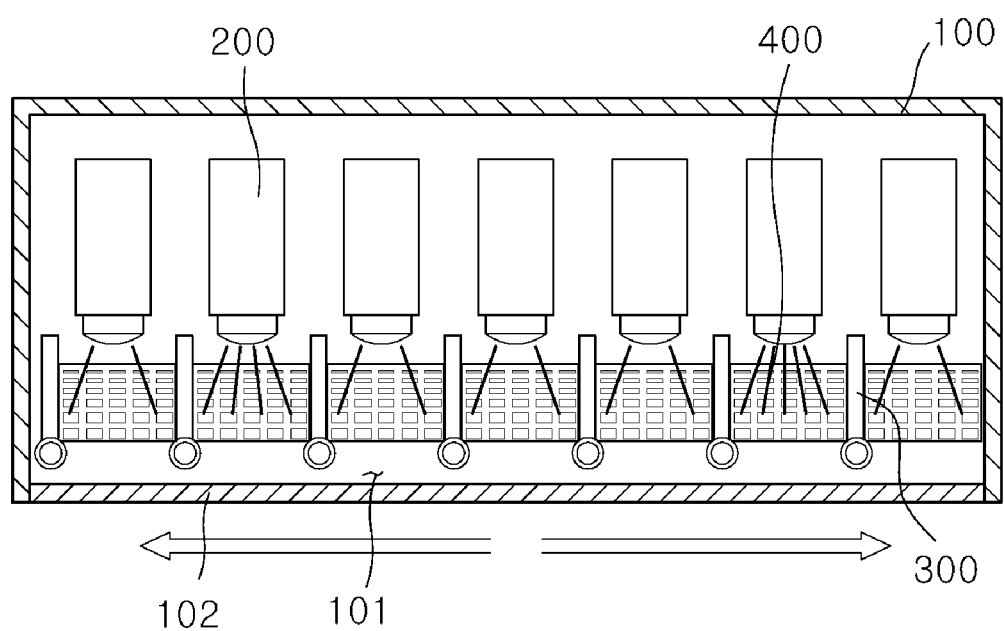
Figure 19:
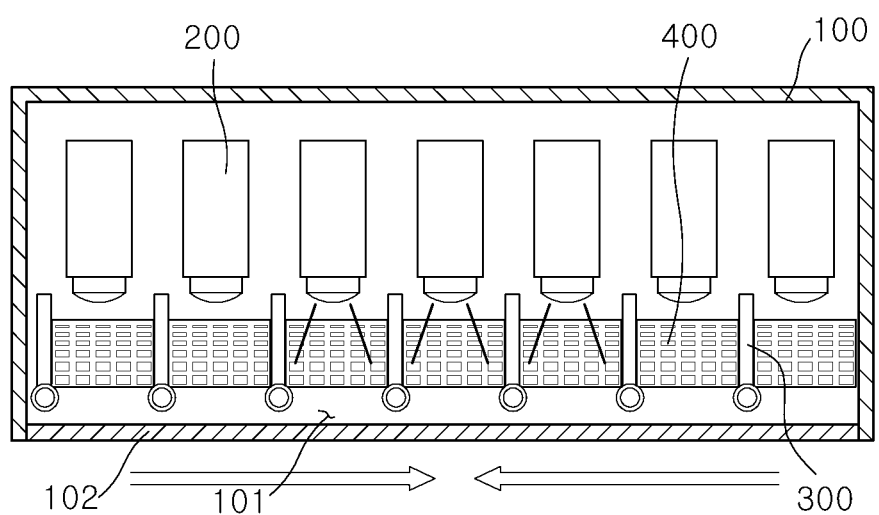
Figure 20:
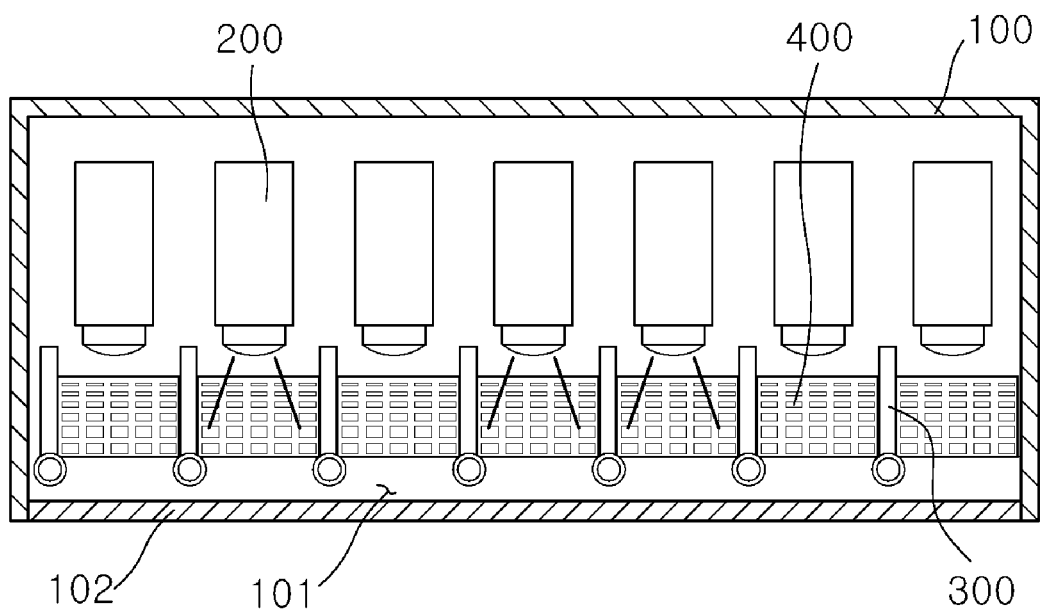

FIG. 16 is a flowchart schematically illustrating a sequence of the second welcome step in accordance with an embodiment of the present disclosure, and FIG. 17 to FIG. 20 are operational diagrams schematically illustrating an operation process of the second welcome step in accordance with an embodiment of the present disclosure.

In the second welcome step S242, the control unit 700 turns on and off the plurality of light emitting units 200 in the state in which the opening 101 has been opened by the flap units 300.

More specifically, the control unit 700 turns on the plurality of light emitting units 200 at the same time with a set amount of light (S242a). As the set amount of light, the amount of light of 70% with respect to the maximum amount of light of the light emitting unit 200 may be exemplified.

The control unit 700 sequentially turns on the plurality of light emitting units 200 in a direction from the center to both ends of the opening 101 with the amount of light greater than the set amount of light (S242b). That is, the control unit 700 sequentially turns on the light emitting units 200, which is disposed at the left and right sides of the light emitting unit 200 located in the center, with a predetermined time difference and the amount of light greater than the set amount of light. Accordingly, the light emitting units 200 are turned on in a form that spreads toward both ends from the center. In such a case, as the amount of light greater than the set amount of light, the maximum amount of light of the light emitting unit 200 may be exemplified.

The control unit 700 sequentially turns off the plurality of light emitting units 200 in a direction from both ends to the center of the opening 101 (S242c). That is, the control unit 700 sequentially turns off the plurality of light emitting units 200 with a predetermined time difference in a direction from the light emitting units 200 disposed at both ends of the opening 101 to the light emitting unit 200 disposed in the center thereof. Accordingly, the light emitting units 200 are turned off in a form that converges toward the center from both ends.

Figure 21:
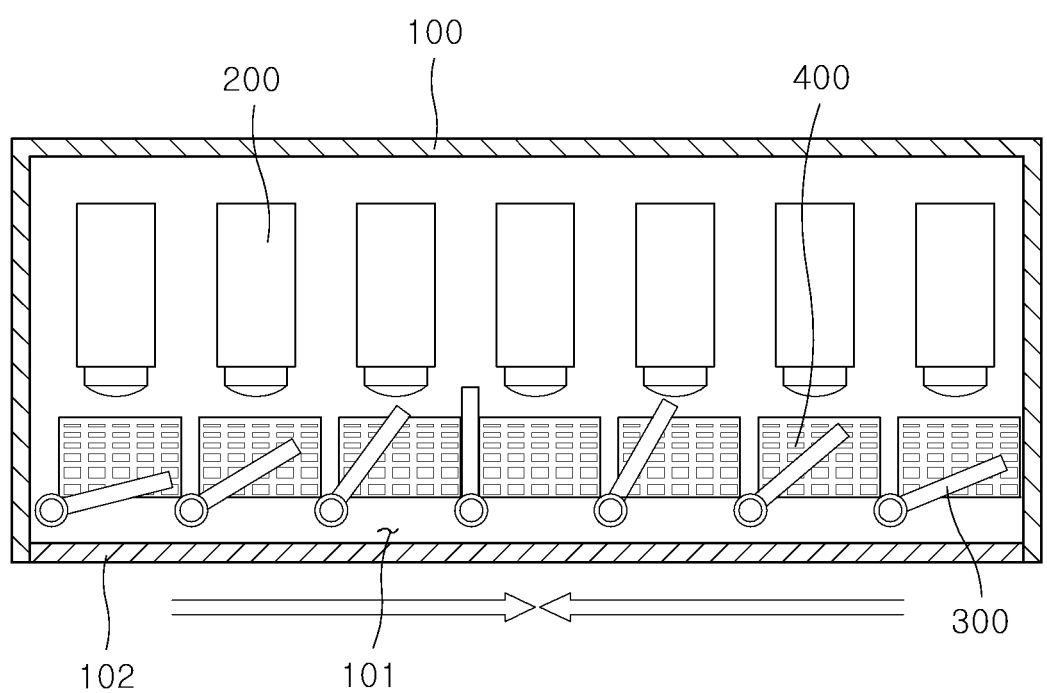
FIG. 21 is an operational diagram schematically illustrating an operation process of a third welcome step in accordance with an embodiment of the present disclosure.

The control unit 700 randomly turns on and then turns off the plurality of light emitting units 200 (S242d). That is, in a state in which the plurality of light emitting units 200 have all been turned off, the control unit 700 turns on and then turns off some of the light emitting units 200 that are randomly selected FIG. 21 is an operational diagram schematically illustrating an operation process of the third welcome step in accordance with an embodiment of the present disclosure.

In the third welcome step S243, the control unit 700 closes the opening 101 by sequentially rotating the plurality of flap units 300 in a direction from both ends to the center of the opening 101. More specifically, in the state in which the opening 101 has been opened, the control unit 700 rotates the plurality of flap units 300 with a predetermined time difference in a direction from the flap units 300 disposed at both ends of the opening 101 to the flap unit 300 disposed in the center thereof. Accordingly, the opening 101 is closed in a form that converges toward the center from both ends.

Figure 22:
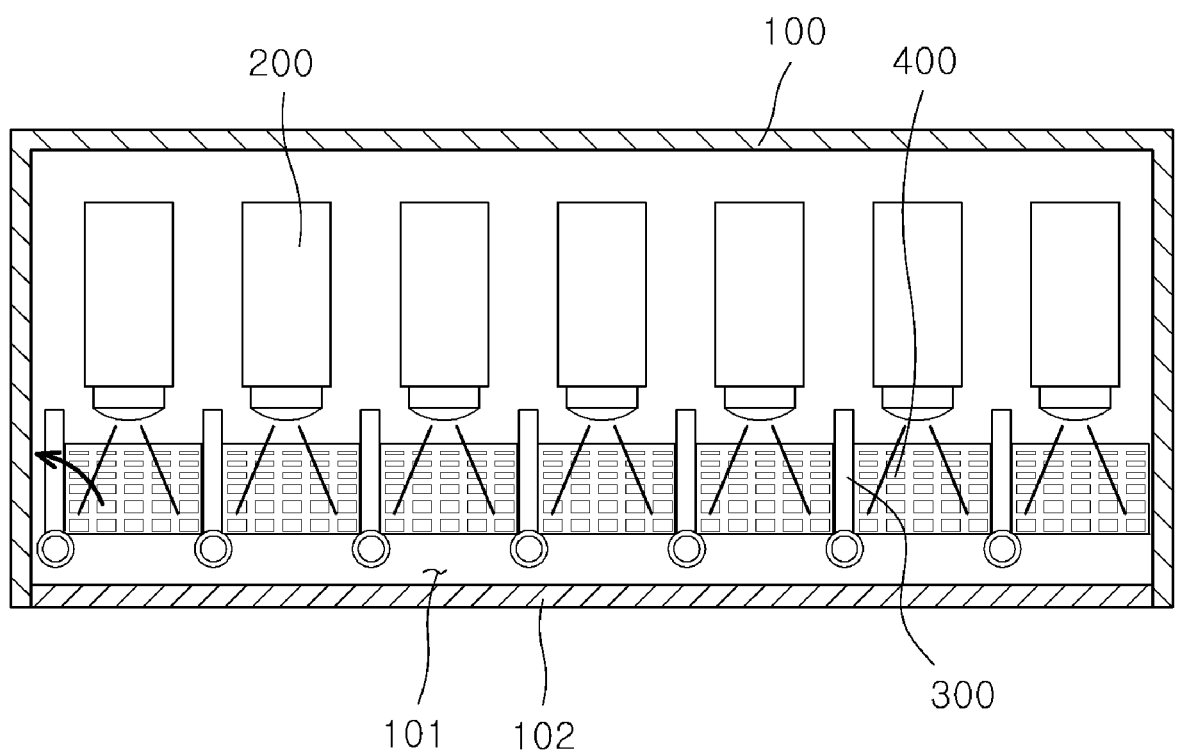
FIG. 22 is an operational diagram schematically illustrating an operation process of a fourth welcome step in accordance with an embodiment of the present disclosure.

FIG. 22 is an operational diagram schematically illustrating an operation process of the fourth welcome step in accordance with an embodiment of the present disclosure.

In the fourth welcome step S244, the control unit 700 rotates the plurality of flap units 300 at the same time to open the opening 101, and turns on the plurality of light emitting units 200 at the same time. That is, the control unit 700 rotates the plurality of flap units 300 so that the closed opening 101 is opened at once over the entire width direction of the housing 100, and turns on the plurality of light emitting units 200 so that light is emitted at once to the outside of the vehicle through the opening 101. In such a case, the light emitting units 200 may be gradually turned on with a predetermined time difference up to the maximum amount of light.

After the fourth welcome step S244, a step may be additionally performed in which, when the control unit 700 determines that the illuminance value around the vehicle measured by the illuminance sensor 630 of the sensing unit 600 exceeds the set illuminance value, the control unit 700 rotates the plurality of flap units 300 at the same time to close the opening 101, and turns off the plurality of light emitting units 200 at the same time.

Meanwhile, when it is determined by the control unit 700 in step S220 that the distance between the vehicle 2 and the driver is out of the second set distance, the control unit 700 determines whether the vehicle 2 is started or the ignition of the vehicle 2 is turned off (S250).

When it is determined in step S250 that or the ignition of the vehicle 2 is turned off, the control unit 700 operates the flap units 300 and the light emitting units 200 to generate a goodbye signal (S260). The control unit 700 may turn on/off the direction indicator lights 3 a set number of times before operating the flap units 300 and the light emitting units 200. Twice may be exemplified as the set number of times.

Figure 23:
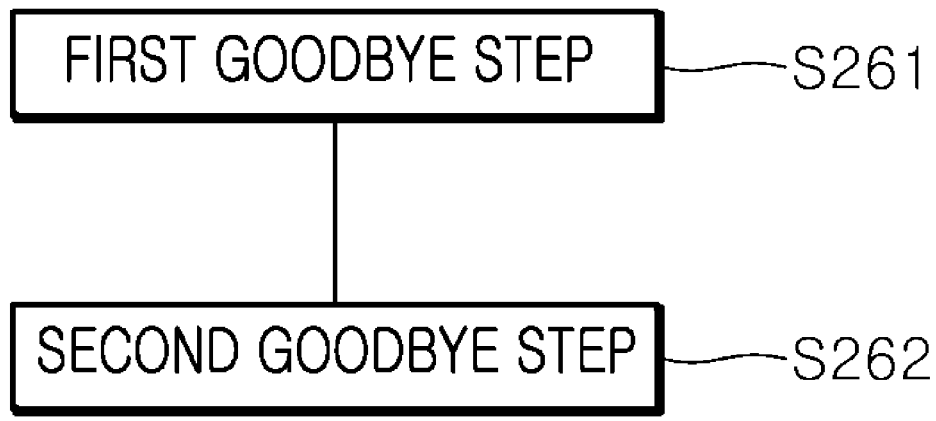
FIG. 23 is a flowchart schematically illustrating a sequence in which the flap units and the light emitting units generate a goodbye signal in accordance with an embodiment of the present disclosure.

FIG. 23 is a flowchart schematically illustrating a sequence in which the flap units 300 and the light emitting units 200 generate the goodbye signal in accordance with an embodiment of the present disclosure.

The step of generating the goodbye signal includes a first goodbye step S261 and a second goodbye step S262.

Figure 24:
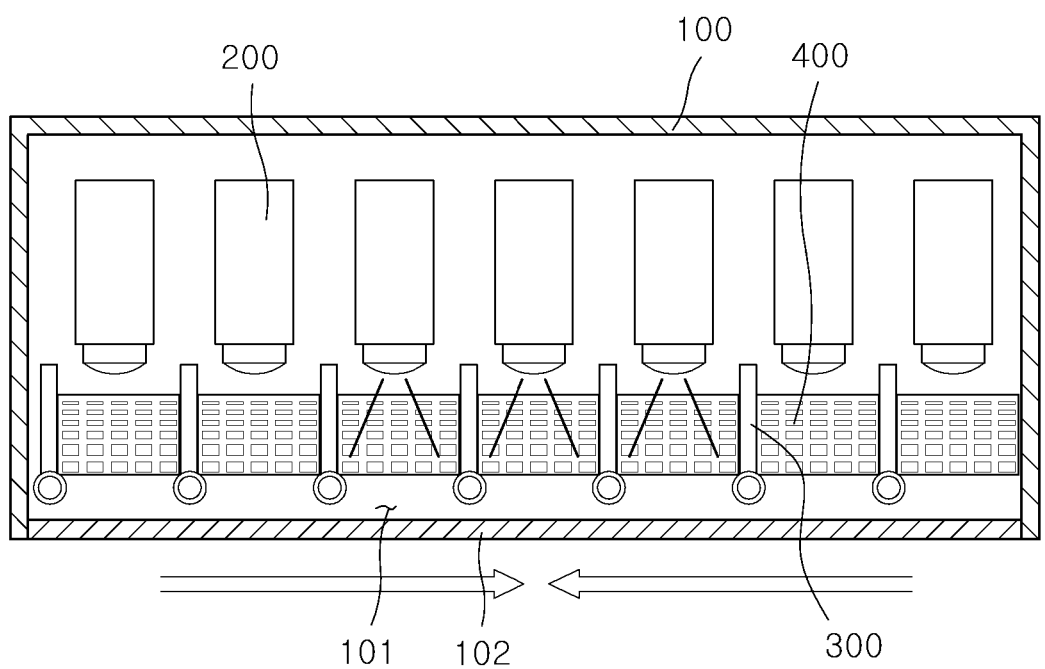
FIG. 24 is an operational diagram schematically illustrating an operation process of a first goodbye step in accordance with an embodiment of the present disclosure.

FIG. 24 is an operational diagram schematically illustrating an operation process of the first goodbye step in accordance with an embodiment of the present disclosure.

In the first goodbye step S261, the control unit 700 sequentially turns off the plurality of light emitting units 200 in a direction from both ends to the center of the opening 101. That is, the control unit 700 turns off the plurality of light emitting units 200 with a predetermined time difference in a direction from the light emitting unit 200 disposed at both ends of the opening 101 to the light emitting unit 200 disposed in the center thereof.

Accordingly, the light emitting units 200 are turned off in a form that converges toward the center from both ends.

Figure 25:
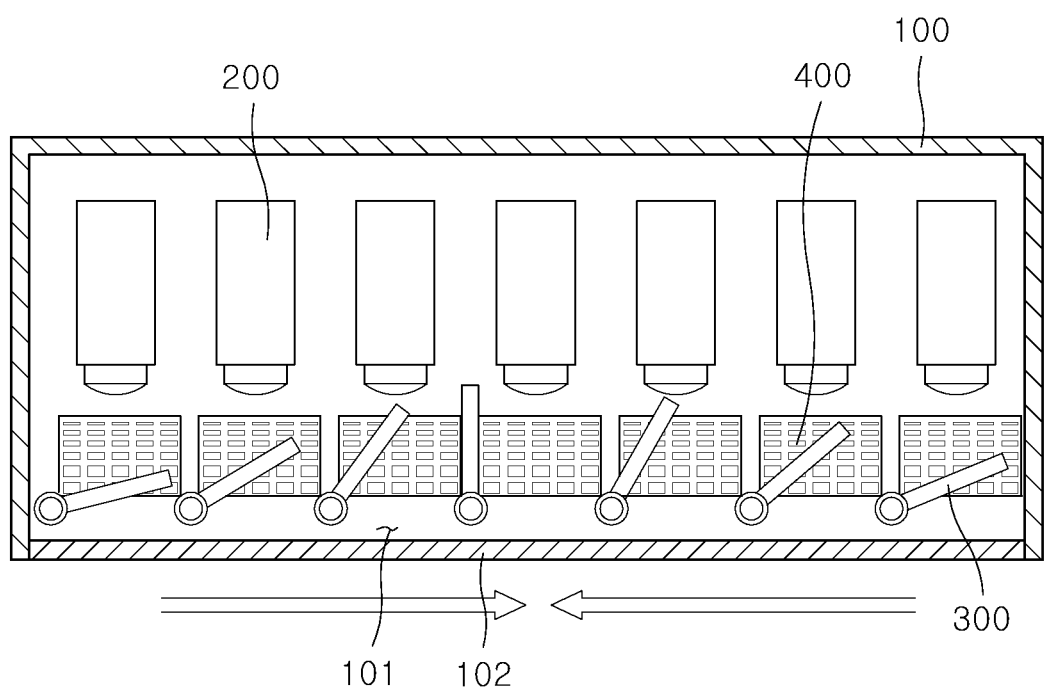
FIG. 25 is an operational diagram schematically illustrating an operation process of a second goodbye step in accordance with an embodiment of the present disclosure.

FIG. 25 is an operational diagram schematically illustrating an operation process of the second goodbye step in accordance with an embodiment of the present disclosure.

In the second goodbye step S262, the control unit 700 closes the opening 101 by sequentially rotating the plurality of flap units 300 in a direction from both ends to the center of the opening 101. More specifically, in the state in which the opening 101 has been opened, the control unit 700 rotates the plurality of flap units 300 with a predetermined time difference in a direction from the flap units 300 disposed at both ends of the opening 101 to the flap unit 300 disposed in the center thereof. Accordingly, the opening 101 is closed in a form that converges toward the center from both ends.

After the second goodbye step S262, the control unit 700 may additionally perform a step of turning off the daytime running light 4.

Although the present disclosure has been described with reference to the embodiments illustrated in the drawings, the embodiments of the disclosure are for illustrative purposes only, and those skilled in the art will appreciate that various modifications and equivalent other embodiments are possible from the embodiments. Thus, the true technical scope of the present disclosure should be defined by the following claims.

What is claimed is:

1. A lighting apparatus for a vehicle, comprising:
  a housing installed inside a front of the vehicle and having an opening formed on one side thereof;
  a plurality of light emitting units installed inside the housing and configured to emit light toward the opening; and
  a plurality of flap units rotatably installed in the housing, disposed to face the plurality of light emitting units, and configured to open or close the opening,
  wherein each of the plurality of flap units comprises:
  a flap member configured to rotate around a rotating shaft part that crosses the housing in a vertical direction; and
  a driving part connected to the rotating shaft part and configured to adjust a rotation angle and a rotation direction of the flap member by generating a driving force,
  wherein a front surface of the flap member has a color different from an inner color of the housing or a surface color of the plurality of light emitting units so that color inversion is performed when the flap member rotates.

2. The lighting apparatus according to claim 1, wherein the plurality of light emitting units and the plurality of flap units are each arranged in at least two rows along a width direction of the vehicle.

3. The lighting apparatus according to claim 2, wherein lighting states of the plurality of light emitting units are individually adjusted, and
  rotational states of the plurality of flap units are individually adjusted.

4. The lighting apparatus according to claim 1, wherein the flap member rotates to an inside of the housing at a set angle to open the opening when a front surface of the flap member is disposed in parallel to a width direction of the vehicle.

5. The lighting apparatus according to claim 4, wherein the set angle is equal to or less than 90°.

6. The lighting apparatus according to claim 1, wherein the plurality of light emitting units are installed in the housing to be movable in a front or rear direction of the vehicle.

7. The lighting apparatus according to claim 1, wherein each of the plurality of light emitting units comprises:
  a light source part configured to be turned on and off;
  a heat sink part configured to support the light source part and discharge heat generated from the light source part;

a reflector part configured to reflect light, which is emitted from the light source part, to one side; and a lens part configured to form a light distribution pattern by transmitting light, which is reflected from the reflector part, toward the opening.

8. The lighting apparatus according to claim 1, further comprising:

a display unit installed in the housing and configured to display a set color to an outside of the vehicle as the plurality of flap units open the opening, wherein the display unit is disposed on a bottom surface of the housing and coated with the set color.

9. The lighting apparatus according to claim 8, wherein the display unit includes a luminous or fluorescent material.

10. The lighting apparatus according to claim 8, further comprising:

a reflection unit installed on the plurality of flap units and configured to reflect the set color, which is displayed by the display unit, toward the outside of the vehicle when the plurality of flap units open the opening.

11. A lighting apparatus for a vehicle, comprising:

a housing installed inside a front of the vehicle and having an opening formed on one side thereof;

a plurality of light emitting units installed inside the housing and configured to emit light toward the opening;

a plurality of flap units rotatably installed in the housing, disposed to face the plurality of light emitting units, and configured to open or close the opening;

a sensing unit configured to sense a distance between the vehicle and a pedestrian or a driver; and a control unit configured to receive sensed information from the sensing unit and transmit a light emitting unit turning-on signal for turning on the plurality of light emitting units and a flap unit control signal for rotating the plurality of flap units, wherein, when the distance between the vehicle and the pedestrian is within a set distance, the control unit transmits the light emitting unit turning-on signal and the flap unit control signal to the plurality of light emitting units and the plurality of flap units, respectively, so that the plurality of light emitting units and the plurality of flap units notify the pedestrian of a walking direction.

12. A lighting apparatus for a vehicle, comprising:

a housing installed inside a front of the vehicle and having an opening formed on one side thereof;

a plurality of light emitting units installed inside the housing and configured to emit light toward the opening;

a plurality of flap units rotatably installed in the housing, disposed to face the plurality of light emitting units, and configured to open or close the opening;

a sensing unit configured to sense a distance between the vehicle and a pedestrian or a driver; and a control unit configured to receive sensed information from the sensing unit and transmit a light emitting unit turning-on signal for turning on the plurality of light emitting units and a flap unit control signal for rotating the plurality of flap units, wherein, when the distance between the vehicle and the driver is within a set distance, the control unit transmits the light emitting unit turning-on signal and the flap unit control signal to the plurality of light emitting units and the plurality of flap units, respectively, so that the plurality of light emitting units and the plurality of flap units generate a welcome signal.

13. The lighting apparatus according to claim 12, wherein, when the distance between the vehicle and the driver is out of the set distance, the control unit transmits the light emitting unit turning-on signal and the flap unit control signal to the plurality of light emitting units and the plurality of flap units, respectively, so that the plurality of light emitting units and the plurality of flap units generate a goodbye signal.

* * * * *